(12) United States Patent
Takeuchi

(10) Patent No.: US 10,733,031 B2
(45) Date of Patent: *Aug. 4, 2020

(54) INFORMATION PROCESSING APPARATUS, METHOD, AND PROGRAM

(71) Applicant: Sony Corporation, Tokyo (JP)

(72) Inventor: Yasuo Takeuchi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/718,253

(22) Filed: Sep. 28, 2017

(65) Prior Publication Data

US 2018/0024871 A1 Jan. 25, 2018

Related U.S. Application Data

(63) Continuation of application No. 15/196,851, filed on Jun. 29, 2016, now Pat. No. 9,817,704, which is a
(Continued)

(30) Foreign Application Priority Data

Feb. 25, 2009 (JP) ................................. 2009-042246

(51) Int. Cl.
*G06F 3/00* (2006.01)
*G06F 9/54* (2006.01)
*G06F 9/455* (2018.01)

(52) U.S. Cl.
CPC ............ *G06F 9/54* (2013.01); *G06F 9/45512* (2013.01); *G06F 9/45533* (2013.01); *G06F 9/541* (2013.01)

(58) Field of Classification Search
CPC .................................. G06F 9/54; G06F 9/541
(Continued)

(56) References Cited

U.S. PATENT DOCUMENTS 4,747,040 A * 5/1988 Blanset ................. G06F 9/4843
718/108
6,141,010 A 10/2000 Hoyle
(Continued)

FOREIGN PATENT DOCUMENTS

CN 160791 4/2005
CN 1661630 8/2005
(Continued)

OTHER PUBLICATIONS

Panagiotis Kougiouris, A Device Management Framework for an object-oriented operating system. (Year 1989).*
(Continued)

*Primary Examiner* — Lechi Truong
(74) *Attorney, Agent, or Firm* — K&L Gates LLP

(57) ABSTRACT

An information processing apparatus is provided including a first operating system incapable of adding or deleting an application and a second operating system capable of adding and deleting an application; and determines whether a received command is a command directed to the first operating system or a command directed to the second operating system by referencing a table in which the command and an operating system for processing the command are associated with each other; retains the table; controls a memory so that the first operating system or the second operating system can start processing based on a result of the determining by the means for determining; and transfers the received command to the first operating system or the second operating system based on the result of the determining.

10 Claims, 15 Drawing Sheets

Related U.S. Application Data continuation of application No. 14/015,082, filed on Aug. 30, 2013, now Pat. No. 9,396,045, which is a continuation of application No. 12/708,123, filed on Feb. 18, 2010, now Pat. No. 8,544,030.

(58) Field of Classification Search
USPC .................................................. 719/310, 319
See application file for complete search history.

(56) References Cited

U.S. PATENT DOCUMENTS

| | | | |
|---|---|---|---|
| 6,226,684 B1 | 5/2001 | Sung et al. | |
| 6,971,109 B1 | 11/2005 | Williams et al. | |
| 7,011,252 B2 | 3/2006 | Ohya et al. | |
| 7,349,970 B2 | 3/2008 | Clement et al. | |
| 8,091,042 B2 | 1/2012 | Chen et al. | |
| 2002/0083216 A1 | 6/2002 | Hickson et al. | |
| 2002/0116632 A1 | 8/2002 | Itoh et al. | |
| 2003/0002503 A1* | 1/2003 | Brewer | H04L 47/10 370/392 |
| 2003/0037224 A1 | 2/2003 | Oehler et al. | |
| 2003/0095567 A1* | 5/2003 | Lo | H04L 29/06 370/466 |
| 2003/0195847 A1 | 10/2003 | Felger | |
| 2003/0204780 A1 | 10/2003 | Dawkins | |
| 2003/0221087 A1 | 11/2003 | Nagasaka | |
| 2004/0010632 A1 | 1/2004 | Kiick | |
| 2004/0200903 A1 | 10/2004 | Ohya et al. | |
| 2004/0225956 A1 | 11/2004 | Beezer et al. | |
| 2004/0226020 A1* | 11/2004 | Birmingham | G06F 9/45537 719/310 |
| 2005/0021751 A1* | 1/2005 | Block | G06F 9/54 709/225 |
| 2005/0091669 A1 | 4/2005 | Lamb et al. | |
| 2005/0102683 A1 | 5/2005 | Branson et al. | |
| 2005/0191968 A1* | 9/2005 | Tabayashi | G06K 7/10297 455/74 |
| 2006/0044984 A1* | 3/2006 | Sato | G06F 11/1435 369/100 |
| 2006/0252462 A1 | 11/2006 | Balakrishnan et al. | |
| 2007/0168728 A1 | 7/2007 | Biouin et al. | |
| 2007/0288941 A1 | 12/2007 | Dunshea et al. | |
| 2008/0180212 A1 | 7/2008 | Aikawa et al. | |
| 2008/0184258 A1* | 7/2008 | Toyama | G06F 9/468 718/106 |
| 2010/0037221 A1 | 2/2010 | Hsieh | |
| 2011/0145842 A1 | 6/2011 | Tofighbakhsh et al. | |

FOREIGN PATENT DOCUMENTS

| | | |
|---|---|---|
| EP | 1054322 | 11/2000 |
| EP | 1569164 | 8/2005 |
| JP | 2003-016410 | 1/2003 |
| JP | 2003-076954 | 3/2003 |
| JP | 2004-318307 | 11/2004 |
| JP | 2005-242445 | 9/2005 |
| JP | 2007-087120 | 4/2007 |
| JP | 2007-871120 | 4/2007 |

OTHER PUBLICATIONS

Japanese Office Action for corresponding JP2009-042246 dated Feb. 24, 2011.
European Search Report dated Dec. 27, 2010 for corresponding European Appln. No. 10001284.8.
Extended European Search Report dated Feb. 6, 2013 for corresponding European Appln. No. 12007603.9.
Communication from European Patent Office dated Jul. 22, 2011 for corresponding European Appln. No. 10001284.8.
Gunther Stattenberger, A Platform-Independent API for Quality of Service Management, 2001.
Han et al., "A Dynamic Operating System for Sensor Nodes," 2005, pp. 163-76.
Adans Ko, Design and Architecture of Planning and Sequence System for Mars Exploration Rover (MER) Operations, 2004.
Chinese Office Action for App. No. 20101011777.6 dated Jul. 8, 2016.

* cited by examiner

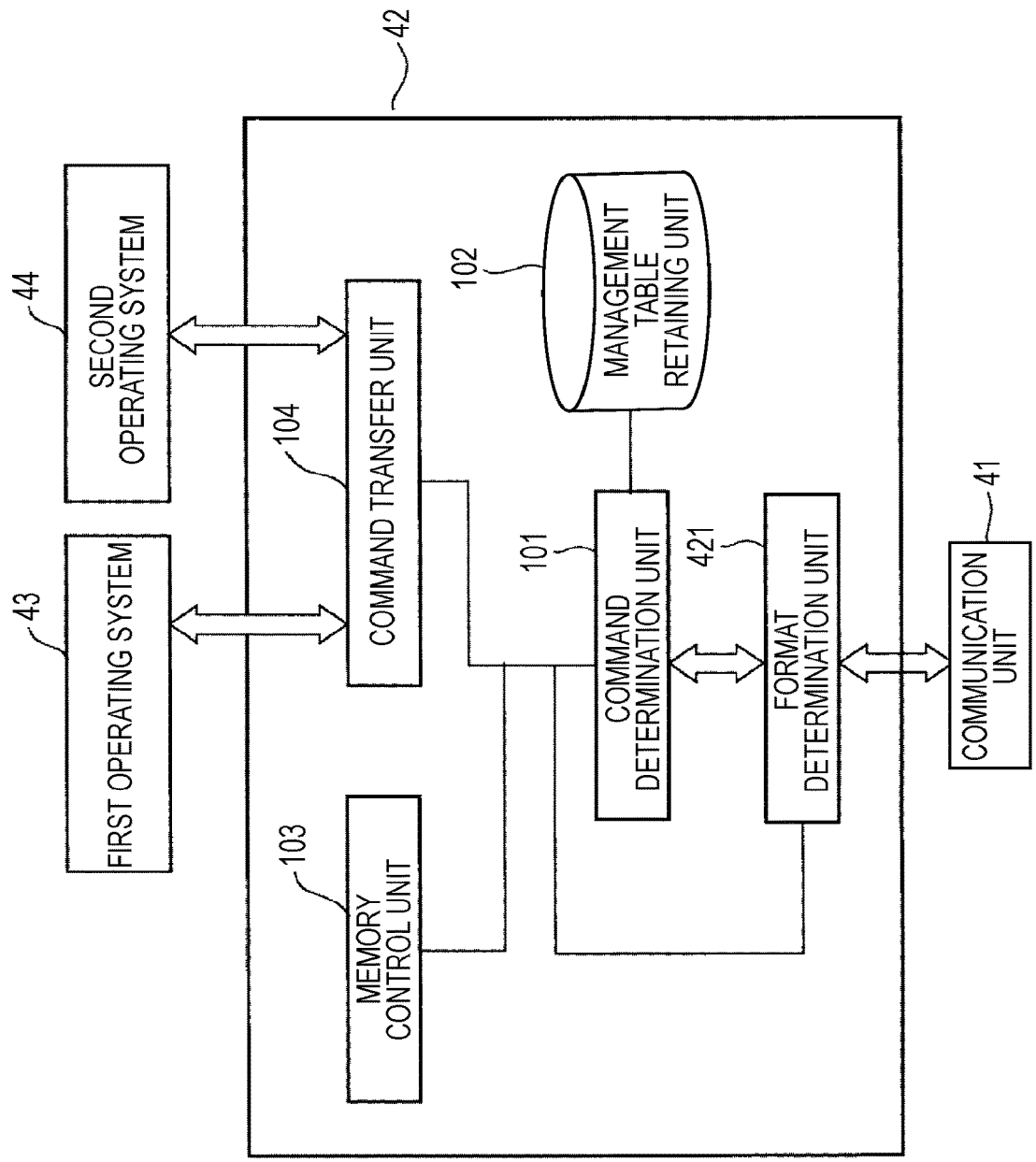

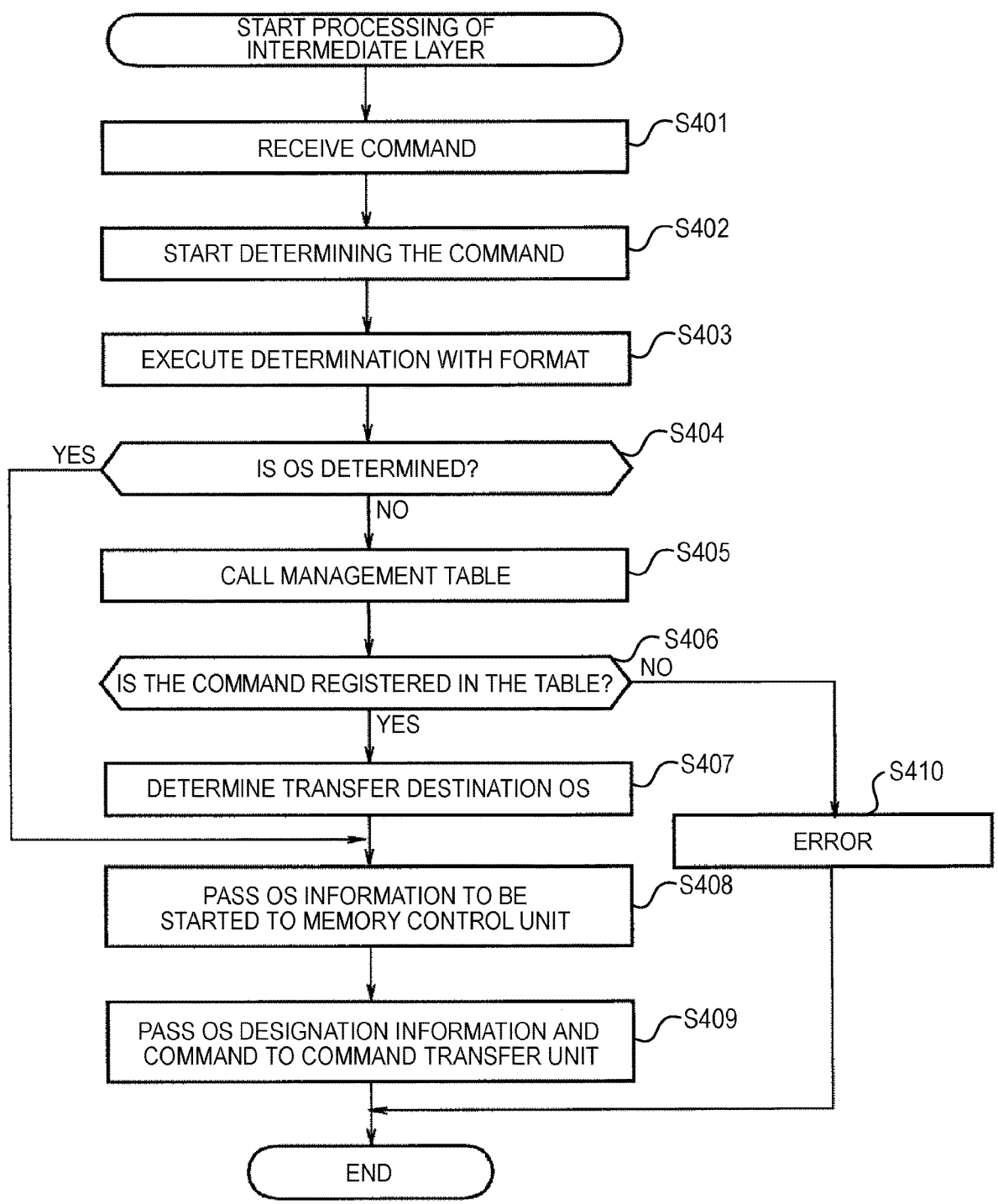

INFORMATION PROCESSING APPARATUS, METHOD, AND PROGRAM

CROSS REFERENCES TO RELATED APPLICATIONS

The present application is a continuation of U.S. application Ser. No. 15/196,851, filed Jun. 29, 2016, now U.S. Pat. No. 9,817,704, which is a continuation of U.S. application Ser. No. 14/015,082, filed Aug. 30, 2013, now U.S. Pat. No. 9,396,045, which is a continuation of U.S. application Ser. No. 12/708,123, filed Feb. 18, 2010, now U.S. Pat. No. 8,544,030, and which claims priority to Japanese Priority Patent Application JP 2009-042246 filed in the Japan Patent Office on Feb. 25, 2009, the entire contents of each of which are hereby incorporated by reference.

BACKGROUND

The present disclosure relates to an information processing apparatus, method, and program. More particularly, the invention relates to an information processing apparatus, method, and program that are capable of processing a received command with an appropriate operating system when a plurality of operating systems are incorporated.

In recent years, cards having an IC (integrated circuit) and a contactless antenna module for enabling contactless communication have been used widely. Such cards are called contactless IC cards, for example, and they are configured to be capable of performing contactless communication with other devices. The contactless communication using the contactless IC cards is used, for example, for transport tickets, electronic cash, ID cards, and room entrance and exit control, and their uses have been increasing.

Because their uses are increasing, the contactless IC cards are configured to have OSs (operating systems) that are suitable for the uses. (See, for example, JP-A-2007-871120.)

Not just IC cards but also information processing apparatus such as personal computers may have a plurality of OSs, and such OSs may be switched from one to another according to the use. Such a personal computer has a partition table in the MBR (Master Boot Record). A boot sector of the OS that needs to be activated is called to switch over the OS.

However, in this technique, it is necessary to explicitly set which of the OSs is to be called. Therefore, it is necessary to modify the procedures for starting up each of the OSs. Moreover, this technique requires that the OS should be switched at first, and it is not suitable for switching the OS from one to another in real-time.

Because the OSs in an IC chip of an IC card operate by receiving a character string as a command, it may be conceivable to use a technique of adopting a mapping table of commands and OSs and selecting an OS to be operated according to the received command.

However, in this technique, there is a possibility that, when an application is added to an OS, an appropriate OS cannot be selected unless the mapping table contains the new command of the application and the processing cannot be executed appropriately.

Thus, it is desirable that even when a plurality of OSs exist, a command can be passed appropriately to the target OS without changing the existing command specification.

SUMMARY

In an embodiment, an information processing apparatus includes: a first operating system incapable of adding or deleting an application; a second operating system capable of adding and deleting an application; means for determining whether a received command is a command directed to the first operating system or a command directed to the second operating system, by referencing a table in which the command and an operating system for processing the command are associated with each other; means for retaining the table; means for controlling a memory so that the first operating system or the second operating system can start processing based on a result of the determining by the means for determining; and means for transferring the received command to the first operating system or the second operating system based on the result of the determining.

It is possible that the information processing apparatus may further has means for storing the result of the determining by the determining means; and wherein the determining means determines that the command is directed to the second operating system if the received command is not registered in the table and information indicating the second operating system is stored in the means for storing.

The information processing apparatus may constitute an IC chip, an IC card, or a mobile telephone unit.

The information processing apparatus may further include means for updating, when an application operated by the second operating system is added or deleted, a table retained in the retaining means and corresponding to the second operating system according to the adding or deleting of the application.

It is also possible that the table corresponding to the second operating system may have a first table related to default commands and a second table for updating, and the first table and the second table may be managed by physically different memories.

In the information processing apparatus, the second operating system may determine whether or not the received command is a command for adding or deleting an application; the second operating system may determine whether or not the command contains an updating request for the table if it is determined that the command is a command for adding or deleting an application as a result of the determining; and the second operating system may issue an updating request to the updating means if it is determined that the command contains an updating request for the table as a result of the determining.

In another embodiment, an information processing method of an information processing apparatus includes at least a first operating system incapable of adding or deleting an application and a second operating system capable of adding and deleting an application, including the steps of: determining whether a received command is a command directed to the first operating system or a command directed to the second operating system, by referencing a table in which the command and an operating system for processing the command are associated with each other; controlling a memory so that the first operating system or the second operating system can start processing based on a result of the determining; and transferring the received command to the first operating system or the second operating system based on the result of the determining.

In still another embodiment, a computer program product stored on a computer-readable medium including executable instructions that when expected by a processor cause an information processing apparatus including at least a first operating system incapable of adding or deleting an application and a second operating system capable of adding and deleting an application, to execute a process including: determining whether a received command is a command directed to the first operating system or a command directed to the second operating system, by referencing a table in which the command and an operating system for processing the command are associated with each other; controlling a memory so that the first operating system or the second operating system can start processing based on a result of the determining; and transferring the received command to the first operating system or the second operating system based on the result of the determining.

In the embodiments, the information processing apparatus, method, and program includes at least a first operating system that is not capable of adding or deleting an application and a second operating system that is capable of adding and deleting an application. It is determined whether a received command is a command directed to the first operating system or a command directed to the second operating system, by referencing a table in which the command and an operating system for processing the command are associated with each other. A memory is controlled so that the operating system can start processing based on a result of the determining. The command is transferred to the operating system.

According to the embodiments, it becomes possible to pass a command appropriately to a subject OS without changing the existing command specification even when a plurality of OSs exist.

Additional features and advantages are described herein, and will be apparent from the following Detailed Description and the figures.

BRIEF DESCRIPTION OF THE FIGURES

FIG. 15 is a diagram showing an example of the configuration of an intermediate layer in an embodiment.

FIG. 16 is a flowchart for illustrating the process of the intermediate layer.

DETAILED DESCRIPTION

Hereinbelow, preferred embodiments of the invention will be described with reference to the drawings.

[Hardware Configuration]

Figure 1:
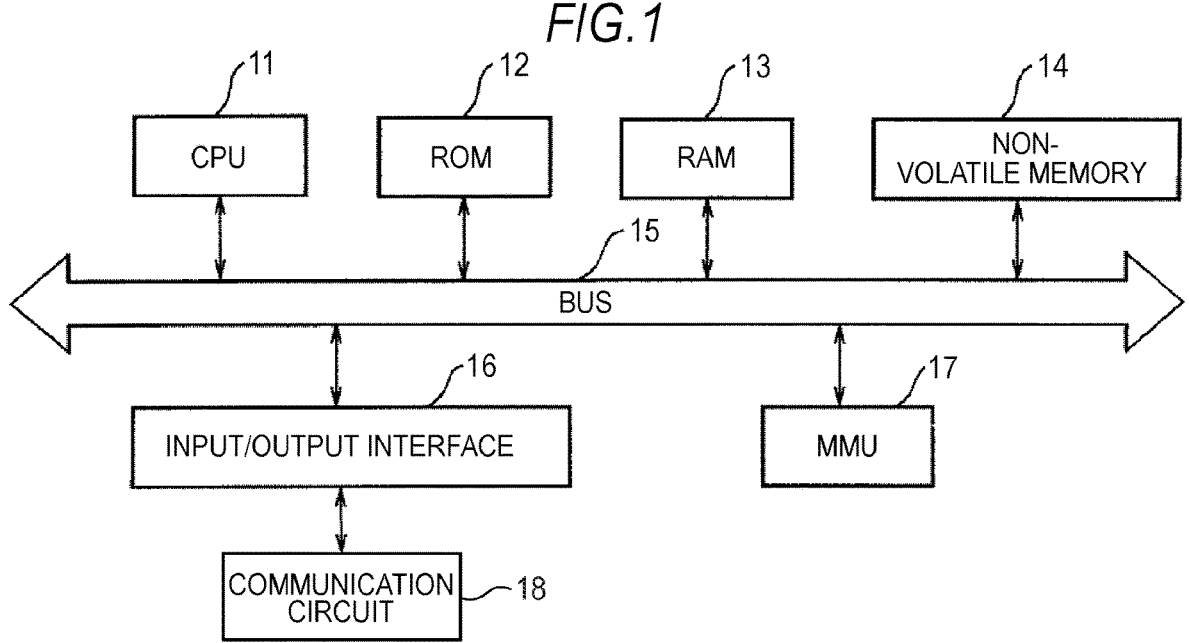
FIG. 1 is a diagram showing the configuration of an information processing apparatus according to an embodiment.

FIG. 1 is a diagram showing the configuration of an embodiment of an information processing apparatus. The information processing apparatus 10 shown in FIG. 1 can be applied to, for example, an IC card that performs contactless communication, an IC chip that constitutes the IC card, and a mobile telephone such an IC chip. The information processing apparatus shown in FIG. 1 is configured to include a CPU (Central Processing Unit) 11, a ROM (Read Only Memory) 12, a RAM (Random Access Memory) 13, a non-volatile memory 14, a bus 15, an input/output interface 16, an MMU (Memory Management Unit) 17, and a communication circuit 18.

The CPU 11, the ROM 12, the RAM 13, the non-volatile memory 14, the input/output interface 16, and the MMU (Memory Management Unit) 17 are connected to the bus 15. The communication circuit 18 is connected to the input/output interface 16.

The ROM 12, the RAM 13, and the non-volatile memory 14 store operating systems and data that the CPU 11 requires for processing. The input/output interface 16 performs data exchange with another apparatus by the communication circuit 18. The MMU 17 controls memories, i.e., the ROM 12, the RAM 13, and the non-volatile memory 14 herein.

It should be noted that an MMU is taken as an example here, but it is also possible to use a memory management function such as an MPU (Memory Protection Unit).

The ROM 12, the RAM 13, the non-volatile memory 14, and the like store management tables or the like. Although the details will be described later, default tables that are not updated, among the management tables, are stored in the ROM 12. It is preferable that, among management tables, updating tables that are to be updated, for example, should be stored in the non-volatile memory 14.

A temporary memory region may be provided in an embodiment. The temporary memory region is a region in which data are stored temporarily. For this reason, it is preferable that the temporary memory region should be constructed by the RAM 13 so that the stored data will be deleted when the power is turned off.

Figure 2:
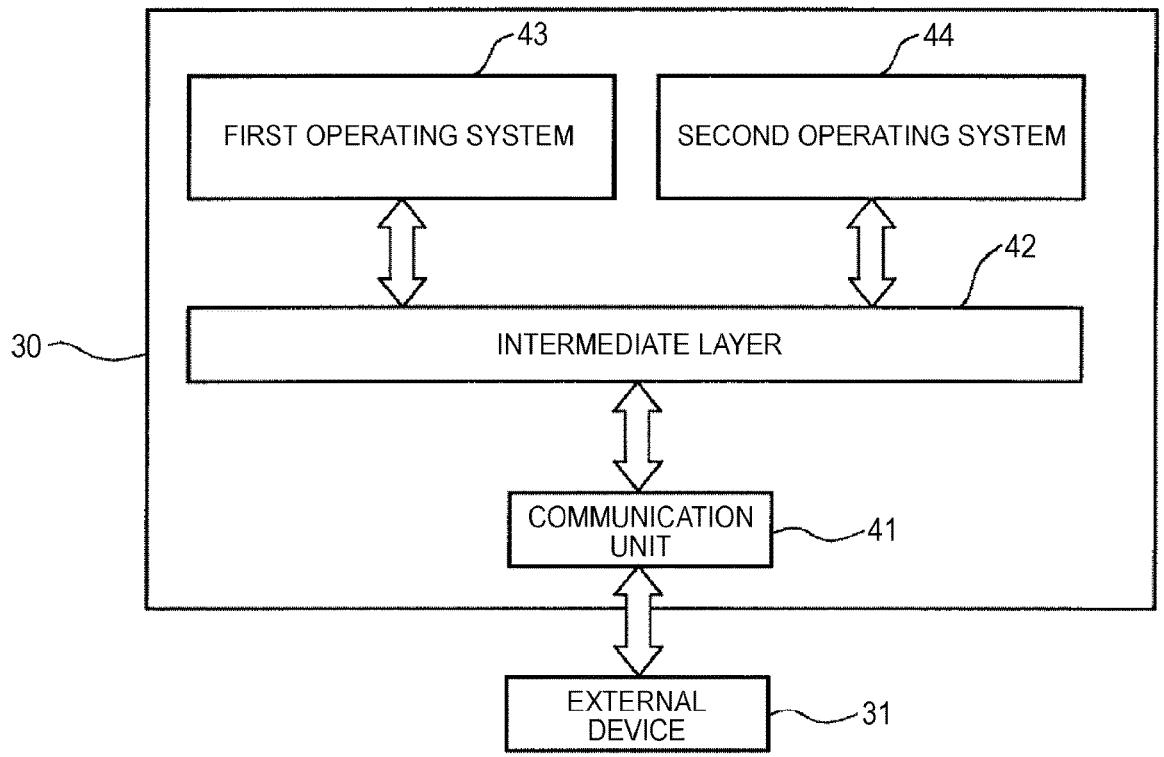
FIG. 2 is a diagram showing the internal configuration of the information processing apparatus.

An intermediate layer 42, a first operating system 43, a second operating system 44, and the like, which are described with reference to FIG. 2, are managed by the RAM 13 or the non-volatile memory 14. An application storing unit for storing applications is constructed by the non-volatile memory 14.

The processing described below may be executed by either hardware or software. When a series of processes are executed by software, a program that constitutes the software is installed in a computer. Here, the computer may include a computer incorporated in dedicated hardware, a general-purpose personal computer in which programs may be installed so that various functions can be executed, and the like.

A series of processes that will be described below are performed by the CPU 11. The CPU 11 executes the programs stored in a memory unit (not shown) that includes the ROM 12, the non-volatile memory 14, and so forth, by loading the programs into the RAM 13. The programs executed by the computer (the CPU 11) may be provided by a removable medium (not shown), for example, as a packaged medium. The programs may be provided via wired or wireless transmission media, such as a local area network, the Internet, and digital broadcasting.

In the computer, programs can be installed in the memory unit via the input/output interface 16, by fitting the removable medium into a drive (not shown) connected to the input/output interface 16. The programs may be installed in the memory unit by receiving the programs by a communication unit (not shown) including the communication circuit 18 via a wired or wireless transmission medium. In addition, the programs may be installed in the ROM 12 or the memory unit in advance.

The program executed by the computer may be a program in which processes are performed in time series in the order described in this description, or may be a program in which processes are performed in parallel or at necessary timing, for example, at the time when the processes are called.

[Function Configuration]

The functions of the information processing apparatus 10 shown in FIG. 1 will be described with reference to FIG. 2. For example, when the information processing apparatus 10 is constructed by a chip, the chip 30 contains a communication unit 41, the intermediate layer 42, the first operating system 43, and the second operating system 44. Data exchange is performed between the chip 30 and an external device 31, which is located outside.

When the information processing apparatus 10 is constructed by a chip or when the information processing apparatus 10 is constructed as a component in a mobile telephone, the external device 31 may be a portion other than the chip, and it is a device connected by wire (for example, another chip). When the information processing apparatus 10 is constructed as a device that can be used alone, such as an IC card, the external device 31 may be a reader/writer that performs contactless communication with the IC card or the like.

Here, the description is continued, with the assumption that the information processing apparatus 10 is the chip 30. The communication unit 41 of the chip 30 performs communication with the external device 31. The communication unit 41 controls communication, and a command, for example, that is supplied from the external device 31 is supplied to the intermediate layer 42. The intermediate layer 42 has the function to bridge data such as a command from the external device 31 to the first operating system 43 and the second operating system 44.

The intermediate layer 42 has the function as a management operating system (management OS). There is a master-slave relationship between the intermediate layer 42 and the first operating system 43 or the second operating system 44. The intermediate layer 42 is a master while the first operating system 43 and the second operating system 44 are slaves.

The first operating system 43 and the second operating system 44 are different operating systems from each other. Although FIG. 2 depicts a configuration that contains two operating systems, the first operating system 43 and the second operating system 44, the invention is not limited to being applicable only to the configuration containing two operating systems but applicable to a configuration containing a plurality of operating systems.

Here, the description is continued, taking as an example the case in which the first operating system 43 and the second operating system 44 are contained in the chip 30, as shown in FIG. 2. The description is continued, with the assumption that the first operating system 43 is an operating system to which no application can be added and that the second operating system 44 is an operating system to which an application can be added. An application can be operated in a condition in which a predetermined operating system has been started up.

The first operating system 43 is an operating system that is capable of operating an application that has already been registered but is not capable of adding or deleting an application that is not registered. The second operating system 44 is an operating system that is capable of operating an application that has already been registered and is also capable of newly adding or deleting an application that is not registered.

By adding an application, a command that can be executed by the application is added. Accordingly, addition of an application is, in other words, addition of a command. Likewise, deletion of an application is, in other words, deletion of a command.

The first operating system 43 is, for example, a FeliCa OS. The FeliCa (trademark) OS is used in cards for, for example, electronic cash. The cards are used for business transactions as an alternative to credit cards or prepaid cards. The FeliCa OS is capable of writing a numerical value that indicates electronic cash into a predetermined region afterwards or specifying a region to be used as electronic cash afterwards. However, it is incapable of function addition, such as newly adding a command as an application or function deletion, such as deleting an existing command.

The second operating system is, for example, Java Card OS. The Java Card OS is capable of additionally incorporating a function as a card application. It should be noted that, here, the description is continued with the assumption that the second operating system is, for example, the Java Card OS. However, as described above, it is sufficient that the second operating system is an operating system that can add a function as an application, and it may be MULTOS OS or a unique Native OS, other than the Java Card OS.

The first operating system 43 and the second operating system 44 are configured so that they cannot access each other. They are not allowed to access each other by employing a logical mechanism such as a firewall, or by controlling them so that they cannot be started up simultaneously by sharing a region physically, or by employing a configuration in which the devices are different.

As illustrated in FIG. 2, the first operating system 43 and the second operating system 44 are configured so that they can communicate with the external device 31 via the intermediate layer 42 that has a kernel function such as a memory control unit for selecting a memory. Although not shown in the drawings, another possible configuration is that each of the operating systems can communicate with the external device 31 directly.

When the first operating system 43 and the second operating system 44 exist in this way, it is necessary to appropriately determine whether a command from the external device 31 is directed to the first operating system 43 or to the second operating system 44, and to process the command.

For example, assume that a command directed to the second operating system 44 is received after the first operating system 43 executed a process. In such a case, if the command is continued to be supplied to the first operating system 43, which has been executing the process, the first operating system 43 will be unable to process the command, so an error occurs. In order to prevent such an event, the intermediate layer 42 is configured to appropriately supply a received command to the first operating system 43 or the second operating system 44. The configuration and operations of such an intermediate layer 42 will be described below.

First Embodiment

Figure 3:
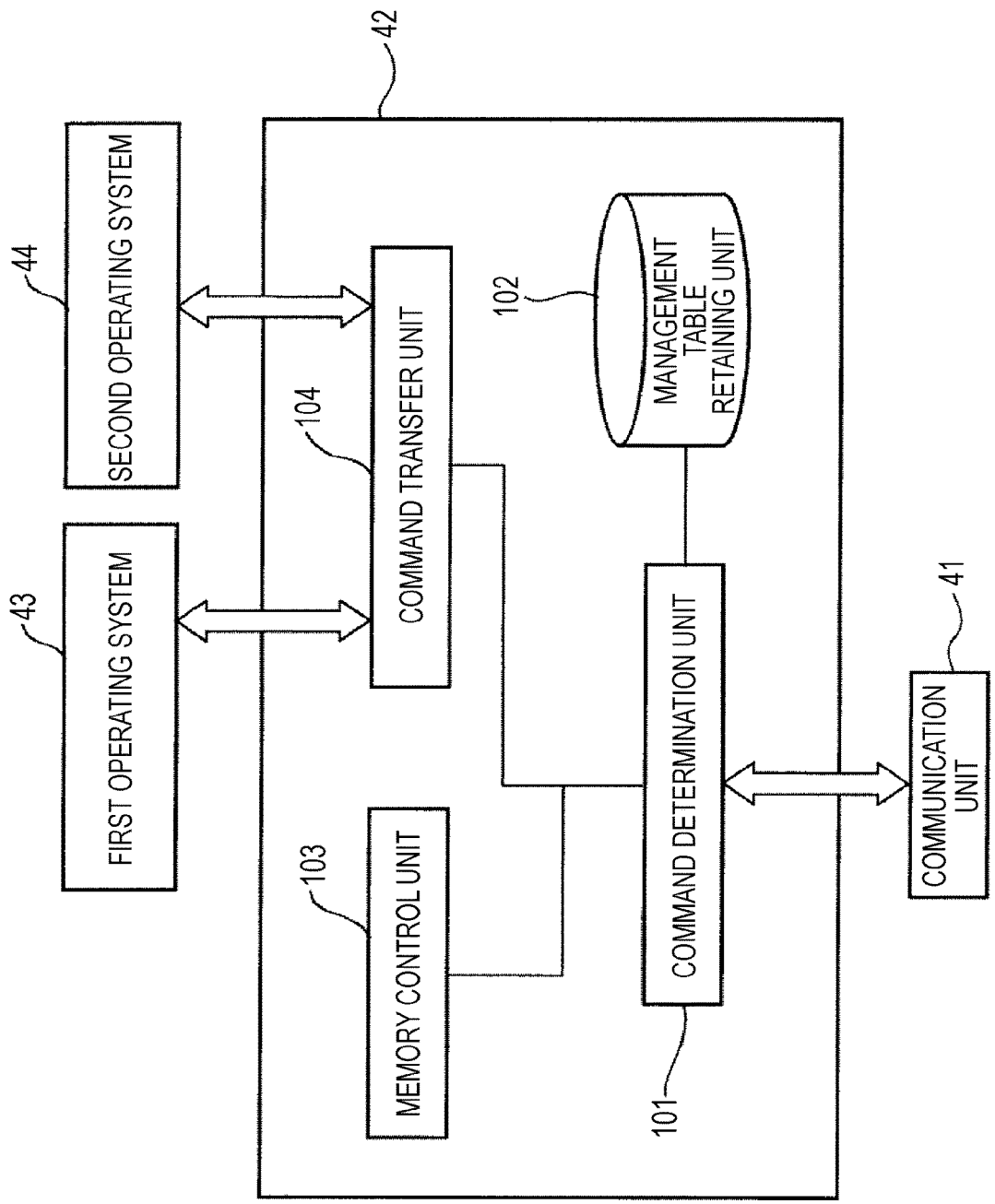
FIG. 3 is a diagram showing an example of the configuration of an intermediate layer in an embodiment.

FIG. 3 is a block diagram showing the function of the intermediate layer 42 in an embodiment. The intermediate layer 42 shown in FIG. 3 is configured to include a command determination unit 101, a management table retaining unit 102, a memory control unit 103, and a command transfer unit 104.

The command determination unit 101 determines whether a command received by the communication unit 41 from the external device 31 is a command directed to the first operating system 43 or a command directed to the second operating system 44, referencing the management table retaining unit 102.

The management table retaining unit 102 includes a table in which, for example, leading part information of the header of a received command is associated with the information indicating to which operating system the command is directed. One example thereof will be described later with reference to FIG. 4.

The memory control unit 103 controls memories based on an instruction from the command determination unit 101. The memories that are the control subject of the memory control unit 103 are the ROM 12, the RAM 13, and the non-volatile memory 14 in the information processing apparatus 10 shown in FIG. 1. The memory control unit 103 can be realized by the memory management function of an MMU (Memory Management Unit) or an MPU (Memory Protection Unit). Alternatively, it may be constructed by a physically different chip, and a plurality of operating systems may be realized by power supply control. The memory control unit 103 may have the function to perform that power supply control.

The command transfer unit 104 transfers a command received by the communication unit 41 to the first operating system 43 or the second operating system 44, based on the determination result of the command determination unit 101.

Figure 4:
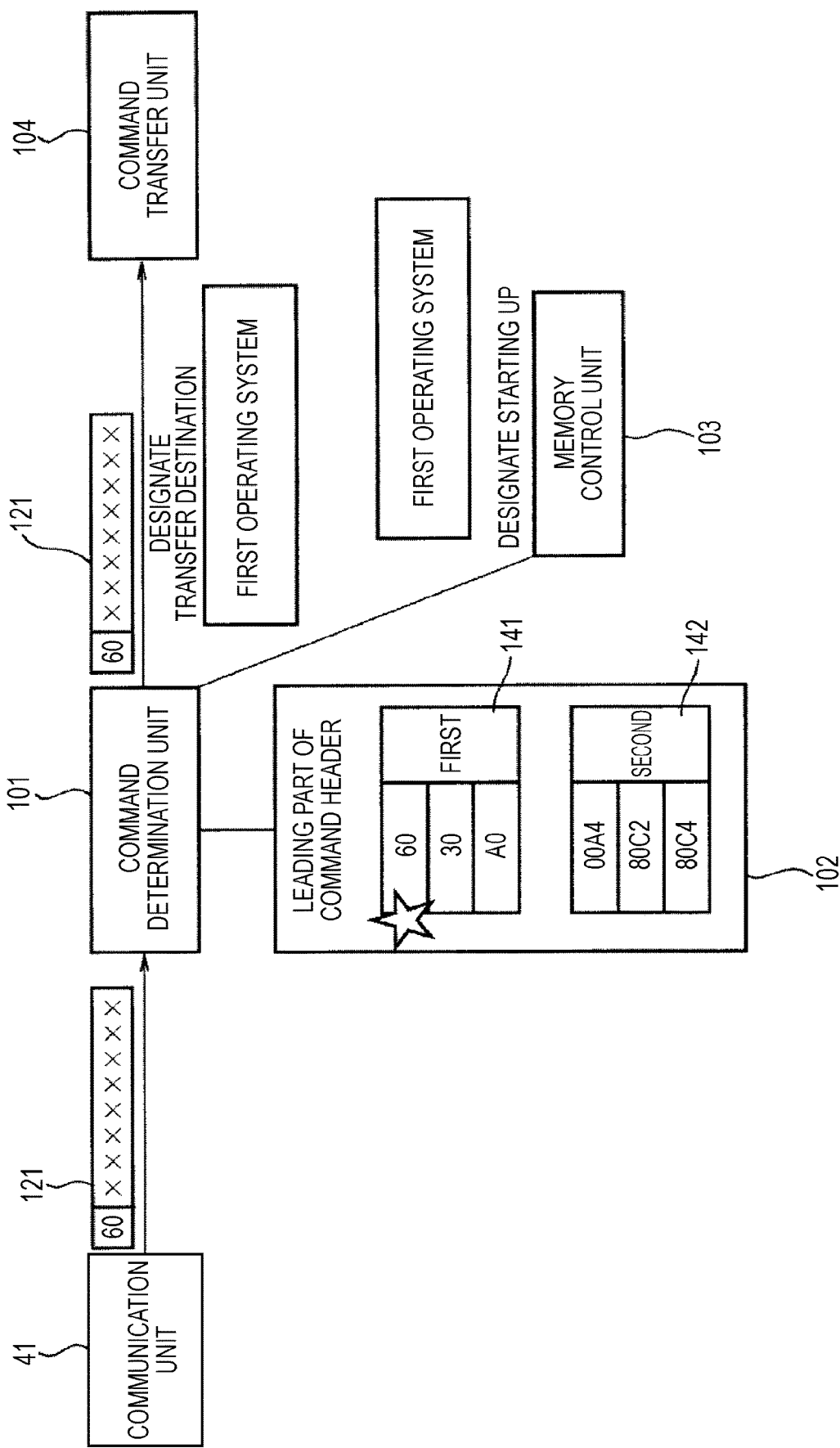
FIG. 4 is a diagram for illustrating a process that refers to a management table.

With reference to FIG. 4, the operation of the intermediate layer 42 shown in FIG. 3 will be described. It is assumed that the communication unit 41 has received a command 121. The information "60" (hexadecimal number system) is written in the leading part of the header of the command 121. The command determination unit 101 reads the information of the leading portion of the header of the command 121 supplied from the communication unit 41, and reads out the information that matches the foregoing information from a table managed by the management table retaining unit 102.

In the example shown in FIG. 4, two tables are managed as the management table retaining unit 102. Here, two operating systems, the first operating system 43 and the second operating system 44, are contained in the chip 30, so the tables corresponding to the respective operating systems are managed by the management table retaining unit 102.

A management table 141 is a table corresponding to the first operating system 43. The management table 141 is configured such that, in the case that the leading part of the header of the command 121 is "60", "30", or "A0" (hexadecimal), it means that the command 121 is a command directed to the first operating system 43. A management table 142 is a table corresponding to the second operating system 44. The management table 142 is configured such that, in the case that the leading part of the header of the command 121 is "00A4", "80C2", or "80C4" (hexadecimal), it means that the command 121 is a command directed to the second operating system 43.

In the example shown in FIG. 4, the information contained in the management table 141 and the management table 142 retained in the management table retaining unit 102 is described in the header leading part of the command, but the information registered in the management tables managed by the management table retaining unit 102 is not limited to the information described in the header leading part of a command. That is, for example, it is possible that the information described in a position other than the header leading part of a command may be registered in the management tables.

When that is the case, the position of the data within the command that is to be compared with the information registered in the management tables is not necessarily limited to the leading part, but it is also possible to designate an arbitral position by the command determination unit 101 that carries out the comparison.

Here, the description is continued assuming that the information described in the header leading part of a command is to be compared. In the example shown in FIG. 4, the information of the leading part of the header of the command 121 that is supplied to the command determination unit 101 is "60", so the command determination unit 101 determines that the command is directed to the first operating system 43 by referencing the management table 141.

When the command determination unit 101 makes such determination, the command determination unit 101 supplies, as well as the command 121, transfer destination information indicating that the command 121 is to be transferred to the first operating system 43, to the command transfer unit 104. Based on the information from the command determination unit 101, the command transfer unit 104 sets the transfer destination of the command 121 as the first operating system 43 and transfers the command 121 to the first operating system 43.

The command determination unit 101 gives a start-up instruction for starting up the first operating system 43 to the memory control unit 103. The memory control unit 103 starts up the first operating system 43. At this time, the memory control unit 103 performs the control operation as follows; it reserves a predetermined memory space for the first operating system 43, or if the memory space is reserved for the second operating system 44 at that time point, it moves the second operating system 44 to another space or frees up the space and assigns the space to the first operating system 43.

Figure 5:
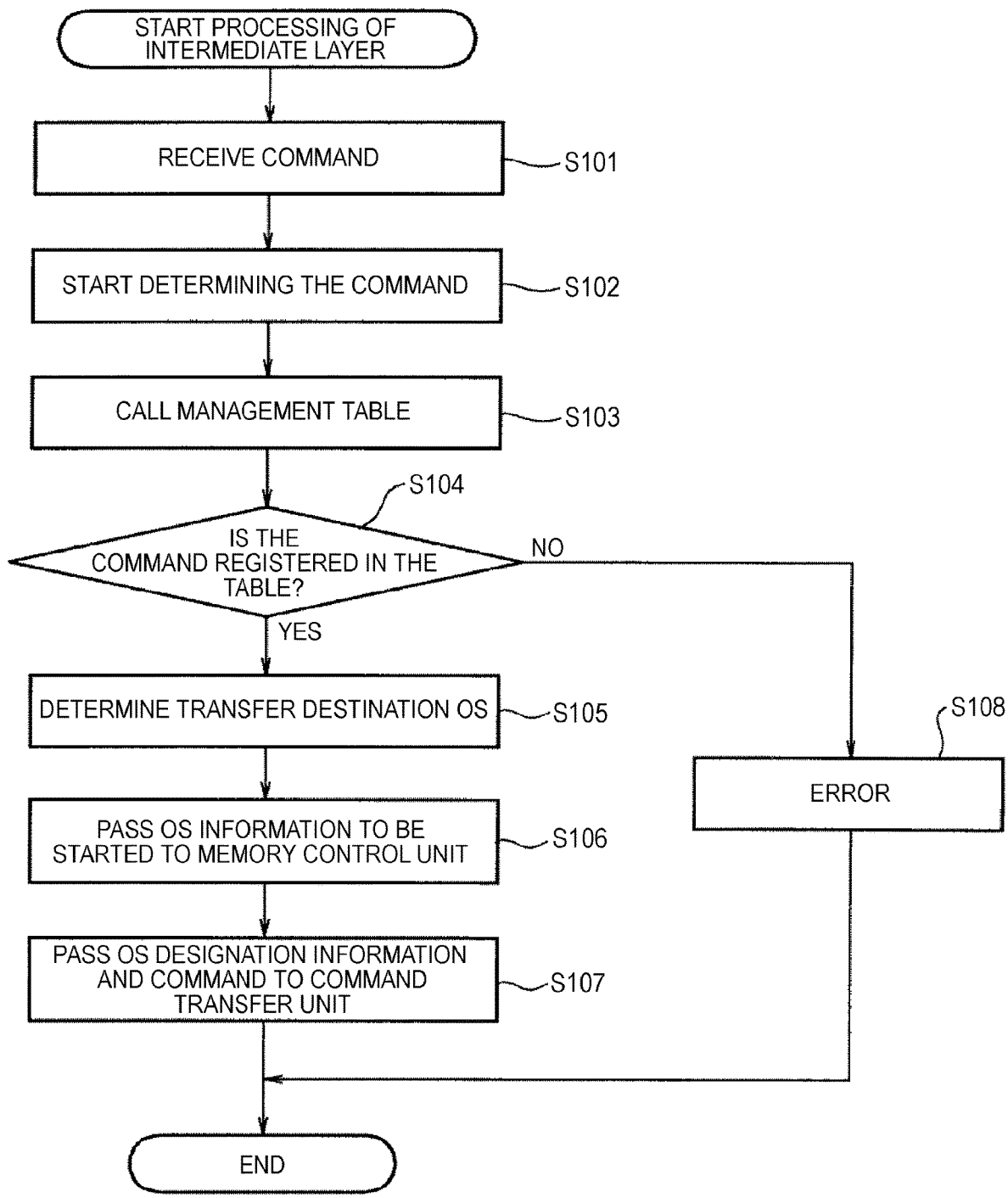
FIG. 5 is a flowchart for illustrating the process of the intermediate layer.

Such processing is described further with reference to the flowchart of FIG. 5.

In step S101, the command determination unit 101 receives a command from the external device 31 that has been received by the communication unit 41. Upon receiving the command, the command determination unit 101 starts determining the command in step S102. When the determining of the command is started, a management table managed in the management table retaining unit 102 is read out in step S103.

Specifically, as described above, the command determination unit 101 reads the information of the leading portion of the header of the received command and determines whether or not the information is registered in the management table retaining unit 102 (in the management table 141 or the management table 142 in this case). If the information is registered, the command determination unit 101 further determines to which of the operating systems the command is directed.

It should be noted that, in the case where to which operating system the command is directed is determined based on the information located in a position other than the leading portion of the command header, the command determination unit 101 performs the determination by reading the information described in a predetermined position.

In step S104, it is determined whether or not the received command is registered in the management table retaining unit 102. In step S104, if it is determined that the received command is not registered in the management table retaining unit 102, it is determined in step S108 that an error has occurred, and an error handling process is executed. Specifically, this is a case in which the received command is neither a command directed to the first operating system 43 nor to the second operating system 44. Accordingly, in this case, it is determined that the received command is not a command to be processed by the operating systems contained in the chip 30, and it is processed as an error (i.e., the received command is not processed). Note that the command determination unit 101 may send a certain character string to the communication unit 41 if it is determined as an error.

On the other hand, in step S104, if it is determined that the received command is registered in the management table retaining unit 102, the process proceeds to step S105, and the transfer destination operating system is determined. Then, in step S106, the command determination unit 101 passes the information indicating the operating system to be started (switched), to the memory control unit 103. While such a process is being executed, the command determination unit 101 passes the operating system designation information and the received command to the command transfer unit 104 in step S107.

Thus, the information processing apparatus 10 (the chip 30) has the first operating system 43 that is not capable of adding or deleting an application and the second operating system 44 that is capable of adding and deleting an application. It also has the command determination unit 101 configured to determine whether a received command is a command directed to the first operating system 43 or a command directed to the second operating system 44, by referencing a table, retained in the management table retaining unit 102, in which the command and an operating system that processes the command are associated with each other, the memory control unit 103 for controlling a memory based on a determination result of the command determination unit 101 so that the first operating system 43 or the second operating system 44 can start processing, and the command transfer unit 104 for transferring the received command to the first operating system 43 or the second operating system 44 based on the determination result. As a result, the following advantageous effects are obtained.

By the command determination unit 101, it is determined to which of the operating systems the received command is directed appropriately. Based on the determination, the command can be passed to the operating system and also the operating system can be started up. Also, it becomes possible to switch the operating system at the time point when the command is received. Moreover, it is unnecessary to set the operating system to be switched explicitly, in other words, the user does not need to designate the operating system to be switched, so the switching can be done without troubling the user.

Second Embodiment

According to the first embodiment, the received command can be passed to an appropriate operating system. However, if it is determined that the received command is not registered in the management table retaining unit 102 in step S104 (FIG. 5), for example, an error handling process is executed in step S108.

The second operating system 44 is an operating system that is capable of adding an application (i.e., capable of adding a command of the added application). Taking this into consideration, it is possible that a command of an added application related to the second operating system 44 is received even when the command is not registered in the management table retaining unit 102.

In other words, there may be a case where a command that is determined to be not registered in the management table retaining unit 102 in step S104 can be a command directed to an added application of the second operating system 44. A second embodiment that takes this issue into consideration will be described below.

Figure 6:
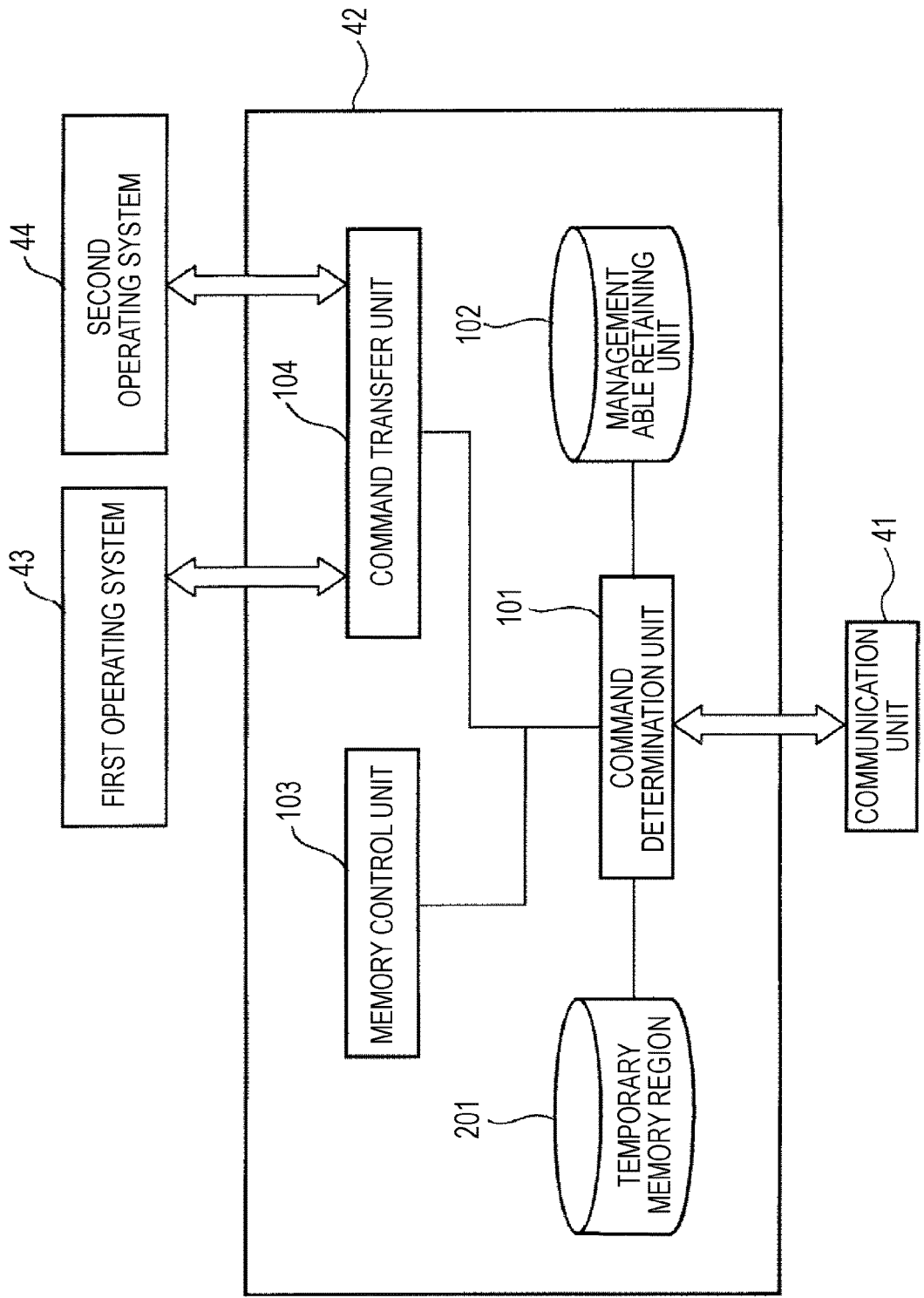
FIG. 6 is a diagram showing an example of the configuration of an intermediate layer in an embodiment.

FIG. 6 is a block diagram showing the function of the intermediate layer 42 in an embodiment. When comparing the intermediate layer 42 shown in FIG. 6 with that shown in FIG. 3, the intermediate layer 42 shown in FIG. 6 is configured to additionally have a temporary memory region 201 to the intermediate layer 42 shown in FIG. 3. The other parts and configurations are the same, which are designated by the same reference numerals, and the descriptions thereof are omitted as appropriate.

The information of the operating system that was run at the time point when (until immediately before) the command has been received is stored in the temporary memory region 201. Here, the information indicating the first operating system 43 or the second operating system 44 is stored therein.

Figure 7:
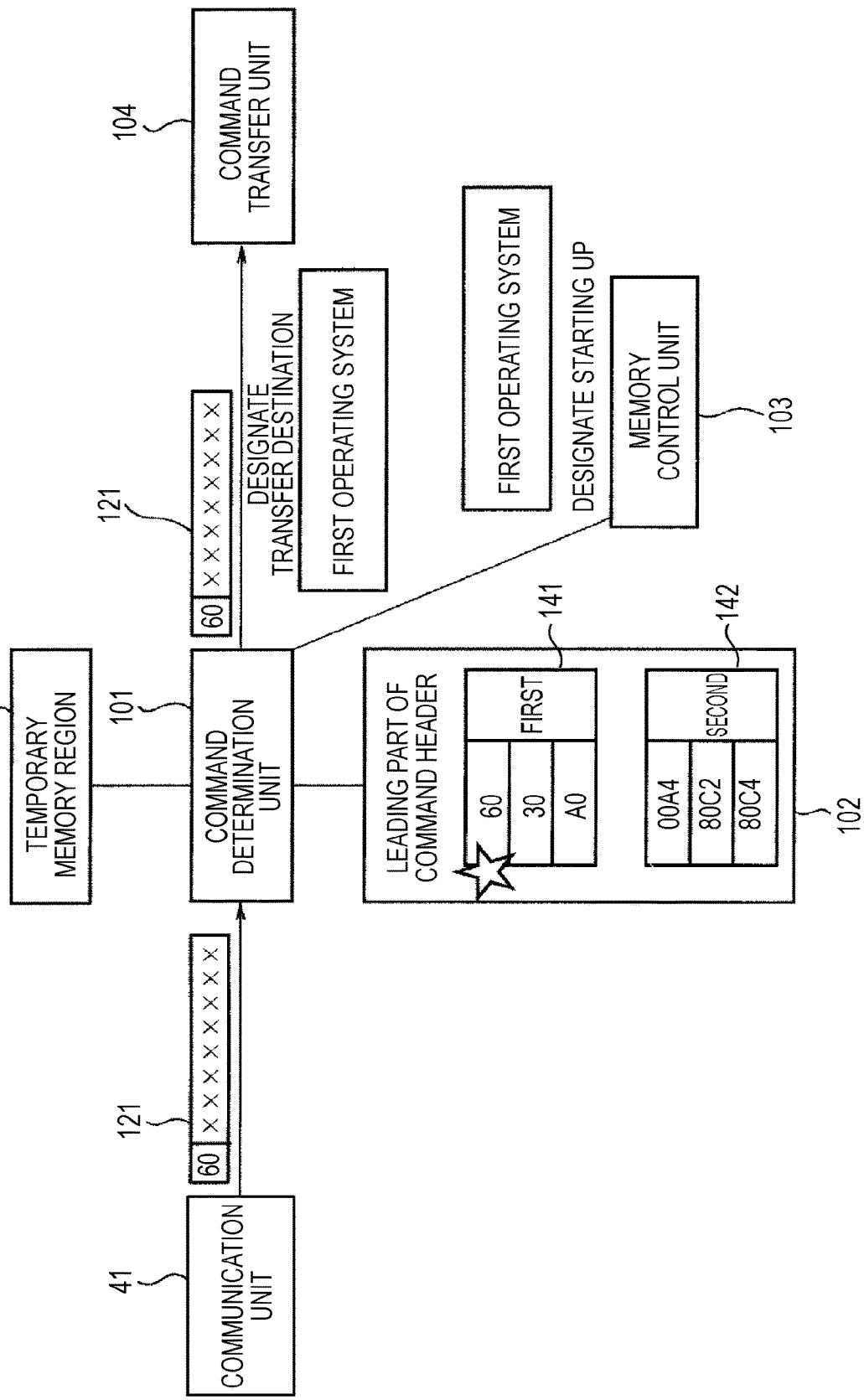
FIG. 7 is a diagram for illustrating a process that refers to a management table.

With reference to FIG. 7, the operation of the intermediate layer 42 shown in FIG. 6 will be described. The description referring to FIG. 7 partially overlaps what has already been described referring to FIG. 4, so the description of the overlapping part will be omitted.

Upon receiving the command 121 from the communication unit 41, the command determination unit 101 references the management table retaining unit 102 and also the information stored in the temporary memory region 201 as necessary. In such a situation as shown in FIG. 7, the information of the leading part of the header of the received command is "60", so it is determined that the command is directed to the first operating system 43 by referencing the management table 141. When it is determined in such a way, the information indicating the first operating system 43 is stored in the temporary memory region 201.

If the received command is not registered in the management table retaining unit 102 and the information indicating the second operating system 44 is stored in the temporary memory region 201, the command determination unit 101 determines that the received command is a command directed to the second operating system 44, and executes the process accordingly.

The reason is that the command is likely to be a command directed to the second operating system 44 when the command that is not registered in the management table retaining unit 102 is received and the command is received while the second operating system 44 is being run, because the second operating system 44 is an operating system capable of newly adding a command as described above. In other words, a newly added application is received and processed at the time point when the second operating system 44 is run. Thus, the command is passed to the second operating system 44.

The initial state of the temporary memory region 201 is a state in which nothing is stored therein, that is, the initial state is a state in which voltage starts to be supplied to the chip 30 (power is turned on). The reason is that there is a possibility that an incorrect process may be executed if the temporary memory region 201 memorizes the operating system when the chip 30 is turned off because the process is executed based on the memorized information when the chip 30 is turned on next time. For this reason, the information stored in the temporary memory region 201 is deleted at the time point when the power is turned off. For that purpose, the temporary memory region 201 is constructed by a RAM 104 (see FIG. 1), as described with reference to FIG. 1.

It should be noted that it is possible to employ a mechanism such that a specific operating system starts up by default after voltage starts to be supplied to the chip 30 (i.e., after power is turned on). In the case where such a mechanism is employed, it is possible that, from the foregoing "state in which nothing is stored", the state of the temporary memory region 201 may be configured to store the information of the specific operating system that has been started up as the information indicating that the specific operating system is the current operating system according to the start-up of the specific operating system.

Figure 8:
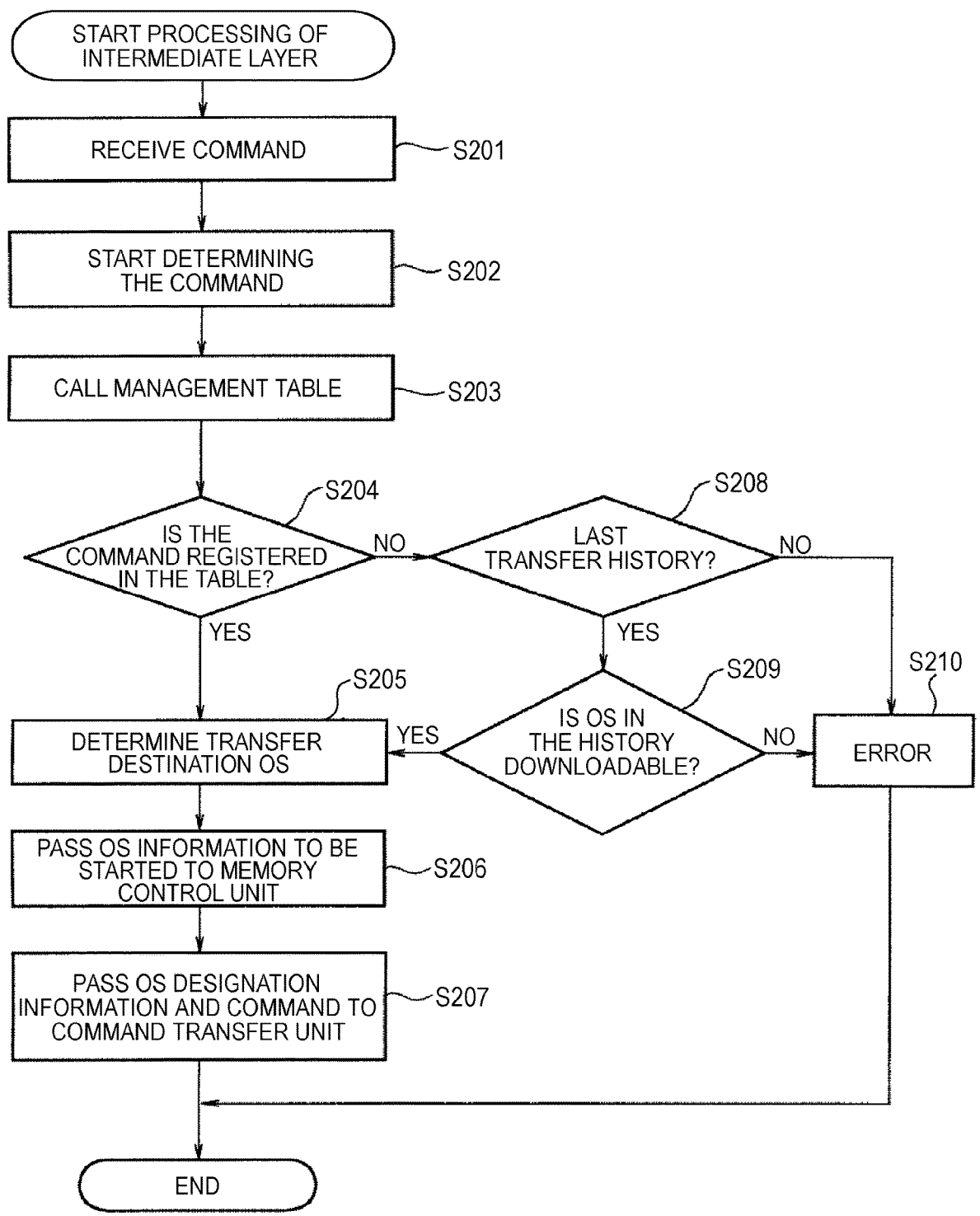
FIG. 8 is a flowchart for illustrating the process of the intermediate layer.

With reference to FIG. 8, the operation of the intermediate layer 42 in the second embodiment will be described further.

The processes of steps S201 through S207 are the same as in steps S101 through S107 of the flowchart of an embodiment shown in FIG. 5, so the description thereof is omitted. Specifically, in the case where the information of the received command is registered in the management table retaining unit 102, the registered operating system is started up (switched), and the command is transferred.

On the other hand, if it is determined that the received command is not registered in the management table retaining unit 102 in step S204, the process proceeds to step S208. In step S208, it is determined whether or not the last transfer history is stored in the temporary memory region 201. For example, if the received command is transferred to the first operating system 43 last time, the information indicating the first operating system 43 is stored in the temporary memory region 201. As described above, information is stored in the temporary memory region 201 unless it is in the initial state. In other words, in the state in which commands are received continuously, some information is stored in the temporary memory region 201.

In this way, if it is determined that the information of the received command is not registered in the management table retaining unit 102, the temporary memory region 201 is referenced. If it is determined that information is stored in the temporary memory region 201 in step S208, the process proceeds to step S209.

In step S209, it is determined whether or not the operating system contained in the history is downloadable. In other words, it is determined whether or not the operating system indicated by the information stored in the temporary memory region 201 is an operating system capable of adding an application.

In the case as shown in FIG. 6, the first operating system 43 is not a downloadable operating system, and the second operating system 44 is a downloadable operating system. Therefore, in this case, if the operating system indicated by the information stored in the temporary memory region 201 is the first operating system 43, it is determined that the operating system in the history is not downloadable in step S209, and the process proceeds to step S210.

In step S210, an error handling process is executed. In this case, the received command is not registered in the management table retaining unit 102, and the operating system that is being run at that time point is an operating system incapable of adding an application. Basically, the commands related to the operating system that is not capable of adding an application are registered in the management table retaining unit 102. Therefore, in such a situation, an error handling process is executed in step S210 because there is no appropriate operating system for processing the received command.

On the other hand, if the operating system indicated by the information stored in the temporary memory region 201 is the second operating system 44, it is determined that the operating system in the history is downloadable in step S209, and the process proceeds to step S205. In this case, the received command is not registered in the management table retaining unit 102, and the operating system that is being run at that time point is an operating system capable of adding an application. Therefore, in this case, when the second operating system 44 is run, the command is likely to be a command that is not registered in the management table retaining unit 102 although it is a command related to the second operating system 44. Accordingly, in step S205, the second operating system 44 is set as the transfer destination operating system.

Thus, the information processing apparatus further has the temporary memory region 201 for storing the result of determining by the command determination unit 101, and the command determination unit 101 determines that the received command is directed to the second operating system 44 if the received command is not registered in a table retained in the management table retaining unit 102 and the information indicating the second operating system 44 is stored in the temporary memory region 201. As a result, the following advantageous effects can be obtained.

When a command registered in the management table retaining unit 102 is received, the processing can of course be performed appropriately. Moreover, it becomes possible to perform the processing appropriately even when the received command is not registered in the management table retaining unit 102.

Third Embodiment

Next, a third embodiment will be described. In the third embodiment, a newly added application (command) is registered in the management table retaining unit 102. The foregoing second embodiment allows the processing to be performed without registering the command, but the third embodiment makes it possible to perform the processing by registering the command.

Figure 9:
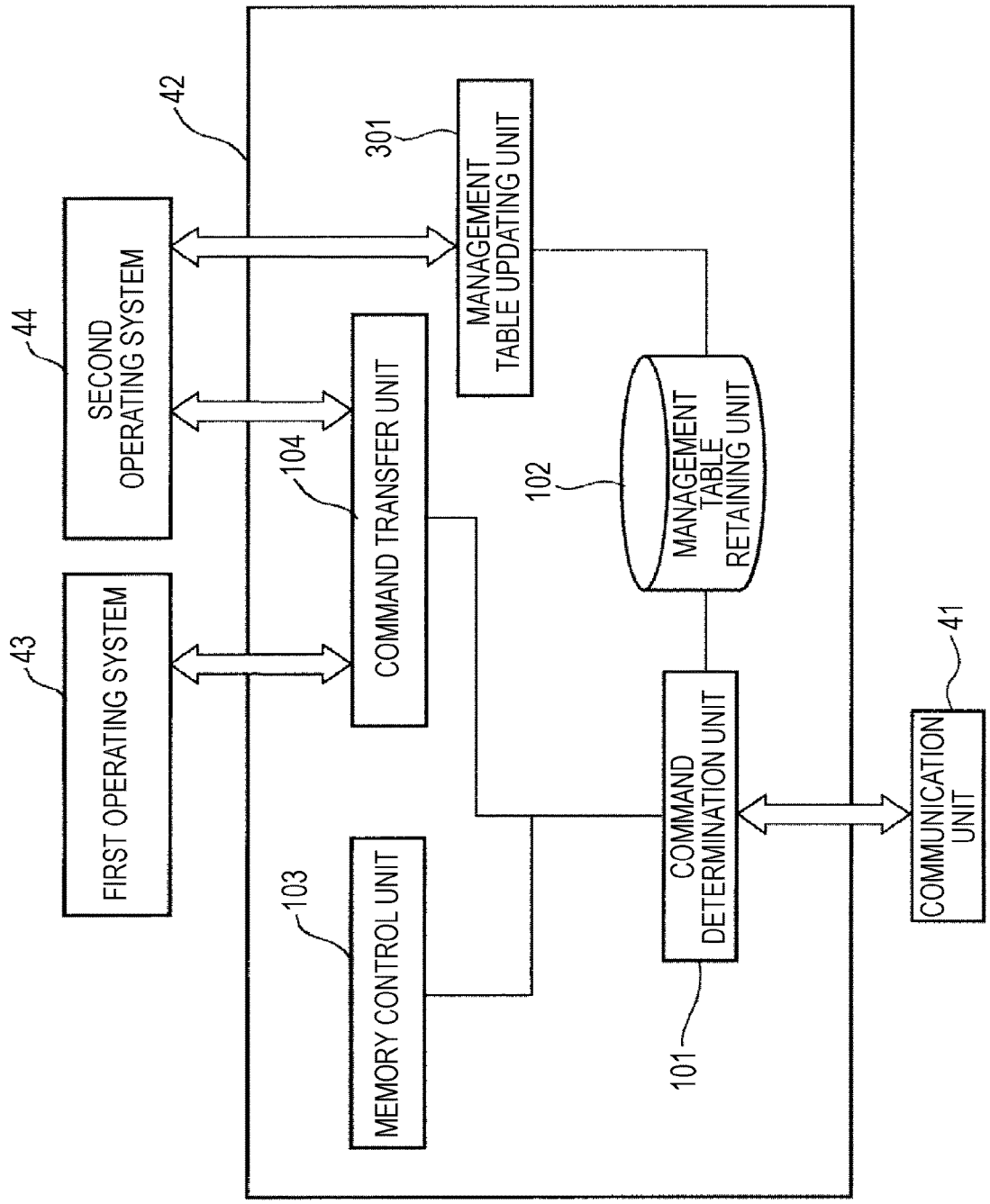
FIG. 9 is a diagram showing an example of the configuration of an intermediate layer in an embodiment.

FIG. 9 is a diagram showing the configuration of the intermediate layer 42 in an embodiment. When comparing the intermediate layer 42 shown in FIG. 9 with that shown in FIG. 3, the intermediate layer 42 shown in FIG. 9 is configured to additionally have a management table updating unit 301 to the intermediate layer 42 shown in FIG. 3. The other parts and configurations are the same, which are designated by the same reference numerals, and the descriptions thereof are omitted as appropriate.

The management table updating unit 301 updates a management table managed by the management table retaining unit 102. The management table retaining unit 102 that is the subject of updating is a table corresponding to the operating system capable of adding an application. Therefore, in a situation shown in FIG. 9, the management table 142 corresponding to the second operating system 44 is the subject of updating. Consequently, an interface that is open only to the second operating system 44 is provided between the second operating system 44 and the management table updating unit 301, as shown in FIG. 9.

Figure 10:
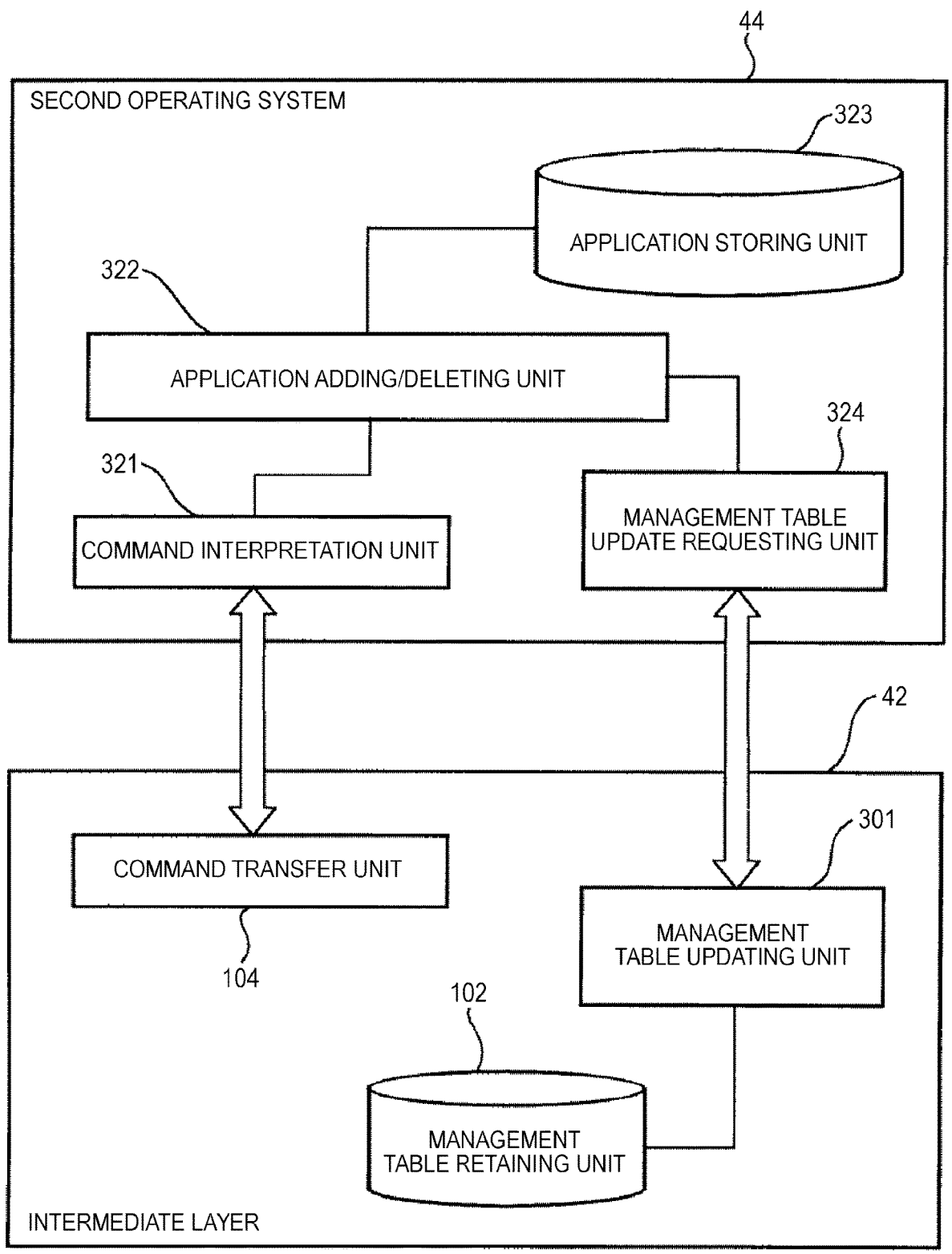
FIG. 10 is a diagram showing an example of the configuration of a second operating system.

FIG. 10 shows a detailed configuration of the intermediate layer 42 and the second operating system 44, which is a portion related to updating of the management table retaining unit 102. The second operating system 44 shown in FIG. 10 has a command interpretation unit 321, an application adding/deleting unit 322, an application storing unit 323, and a management table update requesting unit 324.

The command interpretation unit 321 interprets a command transferred from the command transfer unit 104 and executes a process based on the interpretation. For example, when the command interpretation unit 321 interprets a command as the command for adding or deleting an application, it gives an instruction to add or delete an application to the application adding/deleting unit 322. The application storing unit 323 stores an application.

When adding an application, the application adding/deleting unit 322 causes the application storing unit 323 to store an application to be newly added. When deleting an application, the application adding/deleting unit 322 deletes an application stored in the application storing unit 323 that is designated to be deleted.

In addition, the application adding/deleting unit 322 gives an instruction to the management table update requesting unit 324 so that a command of the application to be newly added will be added in a management table managed by the management table retaining unit 102. Alternatively, the application adding/deleting unit 322 gives an instruction to the management table update requesting unit 324 so that a command of the application that has been instructed to be deleted will be deleted from a management table managed by the management table retaining unit 102.

The management table update requesting unit 324 issues a request of adding or deleting from the application adding/deleting unit 322 to the management table updating unit 301 of the intermediate layer 42. The management table updating unit 301 updates a management table managed by the management table retaining unit 102 based on the instruction (request).

Another configuration of the intermediate layer 42 and the second operating system 44 that performs addition or deletion of an application and updates a management table in a like manner will be described with reference to FIG. 11.

Figure 11:
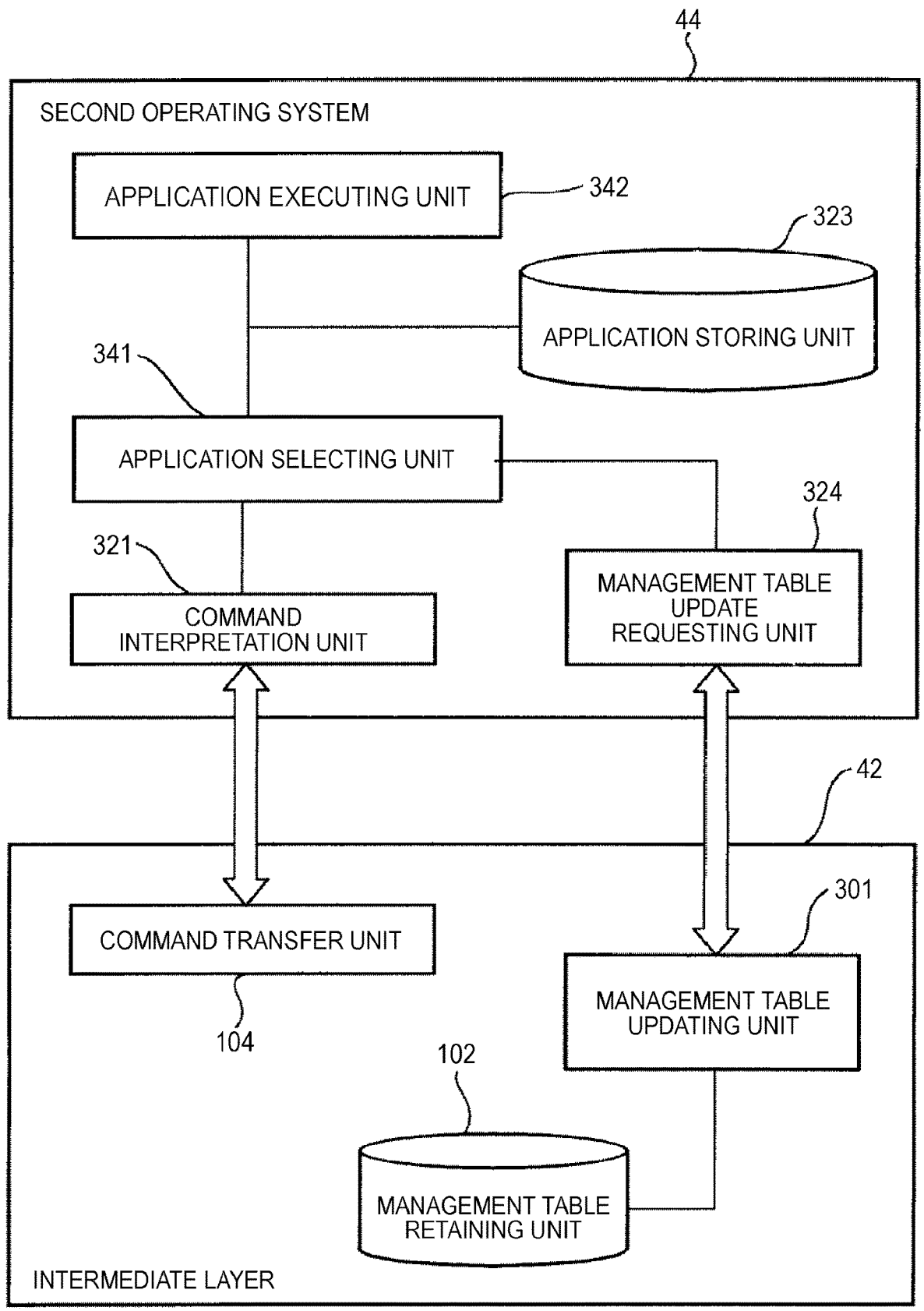
FIG. 11 is a diagram showing another example of the configuration of the second operating system.

The configuration of the intermediate layer 42 shown in FIG. 10 and that shown in FIG. 11 are the same. When comparing the configuration of the second operating system 44 shown in FIG. 11 with that shown in FIG. 10, the second operating system 44 shown in FIG. 11 has an application selecting unit 341 in place of the application adding/deleting unit 322 of the second operating system 44 shown in FIG. 10, and it additionally has an application executing unit 342. The other parts and configurations are the same, so they are designated by the same reference numerals, and the descriptions thereof are omitted.

In the case of the configuration shown in FIG. 11, when the command interpretation unit 321 interprets the command transferred from the command transfer unit 104 as a command for selecting an application, the command interpretation unit 321 passes the command to the application selecting unit 341. The application selecting unit 341 calls an application designated by the command from the application storing unit 323.

The application executing unit 342 executes the designated application, and it transmits the response data generated by the execution of the application to the application selecting unit 341. The application selecting unit 341 interprets the received response data, and if the response data contain an updating request for the management table and data for correction, the application selecting unit 341 passes the data to the management table update requesting unit 324.

The management table update requesting unit 324 issues an updating request to the management table updating unit 301 of the intermediate layer and passes the data for updating thereto. The management table updating unit 301 associates the received data and the information for identifying from which of the operating systems the request has been issued, to update the management table retained in the management table retaining unit 102.

Both configurations shown in FIGS. 10 and 11 are capable of updating a management table, and adding and deleting an application appropriately. That is, updating of the management table and adding/deleting of an application can be carried out appropriately by providing an updating unit that updates a table retained in the management table retaining unit 102 according to adding or deleting of an application when the application processed by the second operating system 44. Here, the description referring to the flowchart of FIG. 13 will be given taking the case of the configuration shown in FIG. 10 as an example.

In the third embodiment, a management table retained by the management table retaining unit 102 is updated. The table that is the subject of updating may be either a table that has already been created or a table that is newly created.

In the case where a table that has already been created is updated, the management table 142 is set as the table that is the subject of updating, with reference to FIG. 4, for example. The management table 142 is a table corresponding to the second operating system 44, which is capable of adding and deleting an application. An updating process is executed for the management table 142, in which a command is newly added thereto or a command that has already been registered is deleted therefrom.

However, it may be undesirable in terms of security when a command that has been registered in the management table 142 as a default and a command that is newly added are managed in the same table. Specifically, when they are managed in the same table, there is a possibility a default command may be deleted or altered. In addition, in order to manage the commands in the same table, the table needs to be stored in the non-volatile memory 14 because it needs to be managed in such a condition that the processes such as command addition and updating can be performed. As a consequence, there is a risk that the table may be altered, for example, as mentioned above.

In view of this, a table for managing a already-registered command, i.e., a default table, and a table that is subjected to updating, such as command addition or deletion, are managed separately. The way of such management will be described with reference to FIG. 12.

The management table retaining unit 102 retains the management table 141 for the first operating system 43, a management table 142-1 for the second operating system 44, and a management table 142-2 for the second operating system 44. Of these management tables, the management table 141 and the management table 142-1 are tables that manage default commands. No new command will be added to the first operating system 43, so only the default management table 141 is managed for the first operating system 43.

On the other hand, addition of a command is possible for the second operating system 44, so a default table, the management table 142-1, and a table for updating, the management table 142-2, are provided for the second operating system 44. Such processes as addition of a new command or deletion of a registered command are configured to be performed only for the management table 142-2 and not to be performed for the management table 142-1. The management table 142-2, which is the table for updating, may be generated when an application is added (when a command is added), or may be prepared in advance.

When a default table and a table for updating are provided in this way, it is undesirable in terms of security that they are stored and managed in the same memory, as described above. For this reason, the default tables, the management table 141 and the management table 142-1, which should not be altered, are stored in a memory that can be kept in a relatively safe condition, such as the ROM 12 (FIG. 1). On the other hand, the table for updating, the management table 142-2, is stored in a memory for which an updating process or the like can be performed and from which data cannot be deleted even when the power is turned off, such as the non-volatile memory 14 (FIG. 1).

Thus, the management tables corresponding to the second operating system, which are expected to be updated, include a first table related to default commands and a second table for updating. The first table and the second table are managed by physically different memories. In this way, it becomes possible to manage the management tables with high security.

Figure 12:
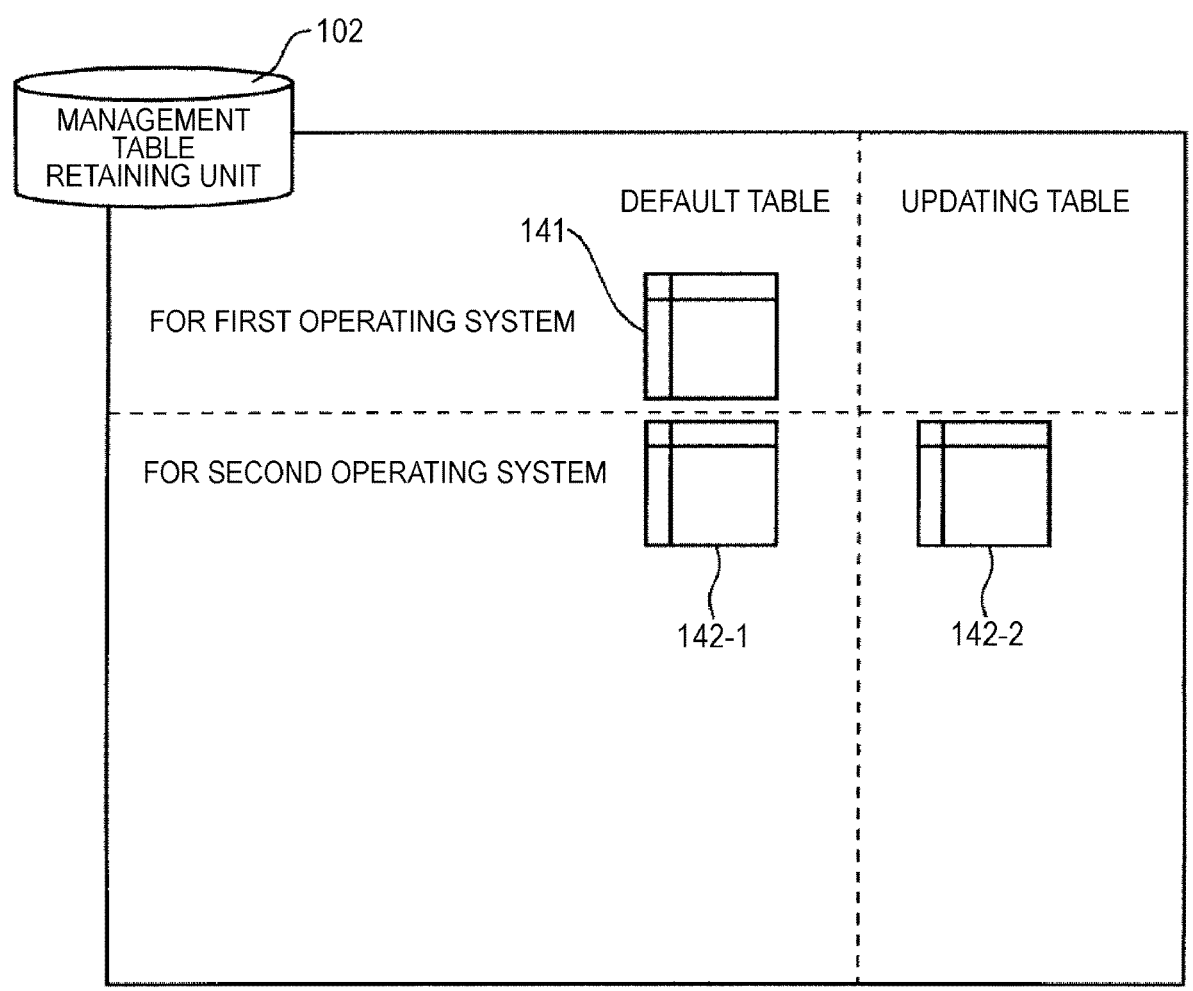
FIG. 12 is a flowchart for illustrating the process pertaining to updating.

When the management tables are configured to have a hierarchy including, for example, a default table and a table for updating, as shown in FIG. 12, data are corrected for the updating table of the subject operating system according to the identification information of the operating system stored in the temporary memory region 201. In the case of employing a configuration in which one management table is shared by a plurality of operating systems, although not shown in the drawings, the identification information for identifying the operating system and the subject data are retained together in the management table retaining unit 102.

Next, the process related to updating, such as addition or deletion of a command, that is executed when the information processing apparatus has the intermediate layer 42 and the second operating system 44 shown in FIG. 10 will be described with reference to the flowchart of FIG. 13.

Figure 13:
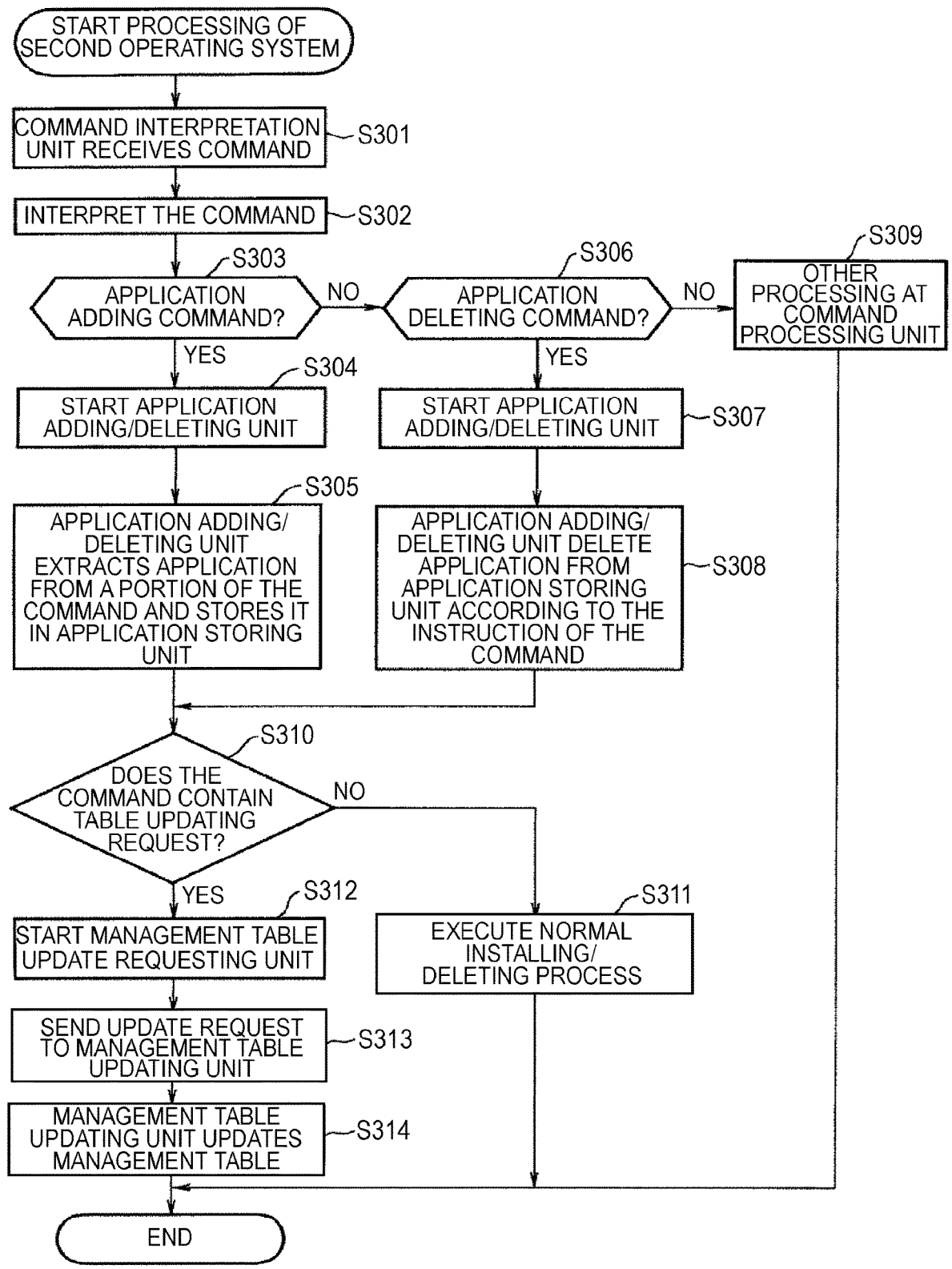
FIG. 13 is a flowchart for illustrating the process of the intermediate layer.

The process shown in the flowchart of FIG. 13 is executed by the second operating system 44. The process is started at the time point when a command is supplied to the second operating system 44. Thus, the process shown in the flowchart of FIG. 5 is executed in the intermediate layer 42 at a time point before the process shown in the flowchart of FIG. 13 is executed. As a result, the second operating system 44 is started, and the command is transferred from the command transfer unit 104 to the second operating system 44.

In step S301, the command interpretation unit 321 receives the command transferred from the command transfer unit 104 in that way. In step S302, the command interpretation unit 321 interprets the received command, and performs the determination in step S303 based on the result of the interpretation. In other words, it is determined in step S303 whether or not the received command is a command for adding an application.

If it is determined in step S303 that the received command is a command for adding an application, the process proceeds step S304. In step S304, the command interpretation unit 321 starts up the application adding/deleting unit 322. The application adding/deleting unit 322 that has been started up extracts an application from a portion of the command in step S305, and causes the application storing unit 323 to store the application. When an application is added in this way, the process of adding or deleting a command is executed as necessary in a process after step S310.

On the other hand, if it is determined that the received command is not a command for adding an application in step S303, the process proceeds to step S306. In step S306, it is determined whether or not the received command is a command for deleting an application. If it is determined in step S306 that the received command is a command for deleting an application, the process proceeds to step S307.

In step S307, the command interpretation unit 321 starts up the application adding/deleting unit 322. In step S308, the application adding/deleting unit 322 that has been started up deletes an application stored in the application storing unit 323 according to the instruction of the command. When an application is deleted in this way, the process of adding or deleting a command is executed as necessary in a process after step S310.

On the other hand, if it is determined that the received command is not a command for deleting an application in step S306, the process proceeds to step S309. In this case, the received command is neither a command for adding an application nor a command for deleting an application, but it is another command. As a result, the command is supplied from the command interpretation unit 321 to a part for processing other commands, although not shown in FIG. 10, and a process associated with the command is executed in the part that has been supplied with the command.

When adding or deleting of an application is performed in step S305 or S306, the process proceeds to step S310. In step S310, the application adding/deleting unit 322 determines whether or not the command contains an updating request for a management table. If it is determined in step S310 that the command does not contain an updating request for a management table, the process proceeds to step S311. In step S311, a normal installing or deleting process is executed. This process does not contain a process for updating a management table.

On the other hand, if it is determined in step S310 that the command contains an updating request for a management table, the process proceeds to step S312. In step S312, the application adding/deleting unit 322 starts up the management table update requesting unit 324. The management table update requesting unit 324 that has been started up issues an updating request for a management table managed by the management table retaining unit 102 to the management table updating unit 301 of the intermediate layer 42.

At this time, an updating request is issued together with the information indicating that the table corresponding to the operating system that has been the subject of adding or deleting an application is the management table of the updating subject. That is, in this case, the management table update requesting unit 324 provides the information indicating that a table that is the management table corresponding to the second operating system 44 and is the subject of updating (i.e., a table that is not a default table) is the management table that is an updating subject.

In step S314, the management table updating unit 301 updates the management table that is designated as the updating subject. In this case, the management table 142-2, which is the management table for the second operating system 44, is updated.

In this way, the management table is updated. Since the management table is updated, the processing can be performed also based on the updated management table when a command is received next time. As a result, it becomes possible to execute the processing appropriately even with an added command.

In this way, in the case where the management table is updated and in the case where the default table and the table for updating are provided separately as shown in FIG. 12, the default table and the table for updating are referenced as necessary during the process of transferring the command received by the intermediate layer 42.

It is also possible to carry out the first embodiment and the third embodiment in combination. In this case, the table for updating is also read out as necessary in addition to the default table when the management table is read out in step S103 shown in the flowchart of FIG. 5. Specifically, upon receiving a command, the command determination unit 101 of the intermediate layer 42 reads out all the management tables retained in the management table retaining unit 102. In the example shown in FIG. 12, the management table 141, the management table 142-1, and the management table 142-2 are read out. Then, the process of step 104 is executed by determining whether or not the information indicating the received command is registered in the management tables that have been read out.

In the case where the first embodiment and the third embodiment are carried out in combination, it is also possible to update a management table and to execute a process using the updated management table. As a result, it becomes possible to process the received command more reliably.

In the case where the first embodiment and the third embodiment are carried out, if it is determined in step S104 that the received command is not registered in the management tables, the process does not proceed to step S108 in which it is determined as an error. Instead, the command is transferred to an operating system capable of adding and deleting an application so that the process related to the updating shown in FIG. 13 can be executed.

In the just-described embodiment, when a command that is not registered in the management tables is received, the received command is transferred to the second operating system 44, and the process shown in the flowchart of FIG. 13 is executed to update a management table, since the second operating system 44 is the operating system that is capable of adding and deleting an application. In this way, a management table can be updated, and moreover, using the updated management table, it is determined that the command is registered in the management table in step S104 when the same command is received next time, whereby the processes after step S105 can be performed appropriately.

In this case, the operating system that is capable of adding and deleting an application contained in the chip 30 is only the second operating system 44. For this reason, when the received command is not registered in the management tables, it can be inferred in step S104 that the received command is a command related to the second operating system 44, and based on the inference, the processing as described above can be performed.

Nevertheless, in such a case that the chip 30 contains two or more operating systems that are capable of adding and deleting an application, it is difficult to infer to which of the operating systems the command is directed. For example, assume that the second operating system 44 and a third operating system (not shown) are stored in the chip 30 as the operating systems that are capable of adding and deleting an application. In such a case, it is difficult to determine (i.e., infer) uniquely to which of the second operating system 44 and the third operating system the command should be transferred, if the received command is not registered in the management tables.

For that reason, in the case where the chip 30 stores a plurality of operating systems that are capable of adding and deleting an application, it is preferable that the second embodiment and the third embodiment are carried out. In the second embodiment, the temporary memory region 201 (FIG. 6) is provided and the process is performed based on the flowchart shown in FIG. 8 as described above. Therefore, when a command that is not registered in the management tables is received, it is possible to determine to which of the operating systems the command should be transferred. As a result, it becomes possible to prevent such an incident that it cannot be determined to which of the operating systems the command should be transferred.

Referring to FIG. 8 again, if it is determined in step S204 that the received command is not registered in the management tables, it is determined in step S208 whether or not the last transfer history is stored the temporary memory region 201. If the last transfer history is stored, it is determined in step S209 whether or not the operating system indicated by the information stored in the temporary memory region 201 is a downloadable operating system. If it is a downloadable operating system, the operating system that is determined as downloadable in step S205 is set as the transfer destination of the command. By executing such a process, a downloadable operating system can execute the process related to the updating shown in FIG. 13.

For example, if the information indicating the second operating system 44 is stored in the temporary memory region 201, the received command can be transferred to the second operating system 44 reliably even when the command is not registered in the management tables, and the updating process for the management tables can be executed with the second operating system 44.

Thus, it is possible to execute the updating of a management table and the process using the management table appropriately, even when a plurality of operating systems that are downloadable are stored in the chip 30.

Moreover, by providing the temporary memory region 201 in the intermediate layer 42, it becomes possible to increase the speed of the processing related to reading of the management tables in step S203. Upon receiving a command, the command determination unit 101 references the temporary memory region 201 and reads out the management table corresponding to the operating system indicated by the information stored therein from the management table retaining unit 102.

For example, if the information indicating the first operating system 43 is stored in the temporary memory region 201, the management table 141 (FIG. 12) is read out. If the received command is not registered in the management table 141 that has been read out, another management table, such as the management table 142-1, is read out.

Alternatively, if the information indicating the second operating system 44 is stored in the temporary memory region 201, the management table 142-1 is read out. Then, if the received command is not registered in the management table 142-1, the management table 142-2 is read out.

By referencing the information stored in the temporary memory region 201 to narrow down the management tables to be referenced in this way, it becomes possible to increase the speed of the processing for searching of whether a command is registered (i.e., searching of the operating system).

Furthermore, although FIG. 12 depicts that the management table 141 corresponding to the first operating system 43 is one table and the description is made accordingly, it is possible that the management table 141 may be configured to contain a plurality of tables (configured to have a hierarchy). For example, it is possible that a command that is likely to be received first and a command that is likely to be received when the first operating system 43 is run may be retained in separate management tables.

In this case, when the information indicating the first operating system 43 is stored in the temporary memory region 201, the subject of the referencing may be set to the management table containing the commands that are likely to be received in the state in which the first operating system 43 is run. Thereby, it becomes possible to further increase the speed of the searching. Of course, it is possible to also divide the management tables other than the management table 141 corresponding to the first operating system 43 into a plurality of tables, so that the speed of the process related to the searching can be increased.

As described above, the first through the third embodiments may be carried out either alone or in combination. The following advantageous effects can be obtained by the embodiments, when carried out either alone or in combination.

It is possible to perform an appropriate command transfer process to an operating system by the intermediate layer 42. As a result, the systems and services that use the existing operating systems can be used without changing their specifications.

Moreover, since it is unnecessary to change the specifications of the commands of the operating systems to be incorporated, it is unnecessary to take care of security degradation or security holes associated with the changes in the specifications, and it becomes possible to reduce, for example, the trouble in designing.

Furthermore, high versatility can be ensured since the operating system to which a command is to be transferred can be determined using the closed conditions in the chip 30 without adding other conditions and the like from the external device 31.

Fourth Embodiment

According to the first through the third embodiments, the received command can be passed to an appropriate operating system by executing the process in which the management tables are referenced. As a fourth embodiment, the following describes an example in which a command is passed to an appropriate operating system more quickly and more reliably by referencing the format of the command.

Figure 14:
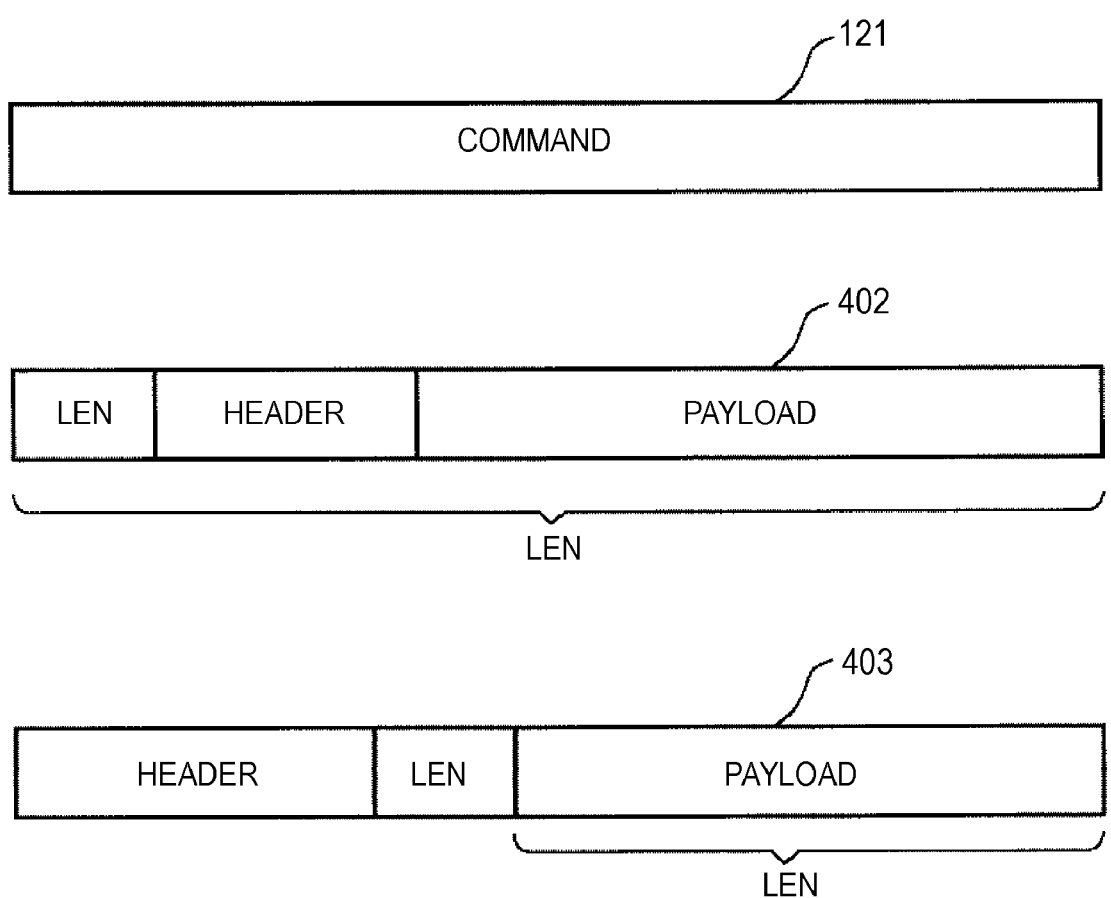
FIG. 14 is a diagram for illustrating a data configuration of a command.

FIG. 14 is a chart for illustrating an example of the data configuration of the command. The command 121 has a configuration shown as a command 402 in the case where it is a command for the first operating system 43. It has a configuration shown as a command 403 in the case where it is a command for the second operating system 44. The command format is specified for each operating system. The arrangements of the fields, the lengths of the fields, and the like are different for different operating systems, as will be described below.

In the command 402, a field "Header" is disposed after a field "Len" indicating data length, and a field "Payload" that stores data such as instruction content is disposed after "Header". The data stored in the field "Len" in the command 402 is the total value of the field lengths of "Len", "Header", and "Payload". In other words, the total length of the command 121 is stored in the field "Len".

In the command 403, a field "Len" is disposed after a field "Header", and a field "Payload" is disposed after "Len". The data stored in the field "Len" in the command 403 is the field length of only the field "Payload". In other words, the field length of the field "Payload" in the command 121 is stored in the field "Len".

Using such a difference in the format, it is possible to determine whether the received command is a command directed to the first operating system 43 or a command directed to the second operating system 44. Specifically, by determining whether or not a value stored in the length (Len) field matches a specific field length, it is possible to decide to which operating system the command is directed. The intermediate layer 42 that utilizes this fact to determine to which operating system the received command 121 is directed will be described below.

FIG. 15 is a block diagram showing the function of the intermediate layer 42 in an embodiment. When comparing the intermediate layer 42 shown in FIG. 15 with that shown in FIG. 3, the intermediate layer 42 shown in FIG. 15 is configured to additionally have a format determination unit 421 to the intermediate layer 42 shown in FIG. 3. The other parts and configurations are the same, which are designated by the same reference numerals, and the descriptions thereof are omitted as appropriate.

The format determination unit 421 determines whether the received command is a command directed to the first operating system 43 or a command directed to the second operating system 44 from the format of the received command. The information about the difference between different formats (for example, the information about the positions where the field "Len" is disposed and the values) is retained in the format determination unit 421.

The format determination unit 421 determines the transfer destination of the supplied command based on the retained information. Based on the determination result, the format determination unit 421 determines whether it gives an instruction to the memory control unit 103 and the command transfer unit 104 or to the command determination unit 101. As in the first through the third embodiments, the command determination unit 101 determines whether the command is a command for the first operating system 43 or a command for the second operating system 44 by referencing the management tables retained in the management table retaining unit 102.

Such determination will be described with reference to the flowchart of FIG. 16. The description referring to FIG. 16 partially overlaps what has already been described referring to FIG. 5, so the description of the overlapping part will be omitted as appropriate.

Upon receiving the command 121 from the communication unit 41, the command determination unit 421 references the format of the command. The format determination unit 421 determines whether or not a specific field length of the received command 121 matches the value stored in the field "Len" field. For example, it is assumed that the field length of "Payload" is used as the specific field length. When the received command 121 is the command 402 (FIG. 14), the value stored in the field "Len" and the value of the field length of "Payload" are different. Therefore, it is inferred that the command is directed to the first operating system 43.

Likewise, when the received command 121 is the command 403 (FIG. 14), the value stored in the field "Len" and the value of the field length of "Payload" match. Therefore, it can be inferred that the command is directed to the second operating system 44.

Here, the reason why it is described that "it can be inferred" is as follows. For example, when the field "Len" of the received command 121 is referenced and the value is found to be "0x80" (hexadecimal), it is inferred that a total length of 128 bytes matches the condition for the first operating system 43. However, it is also possible that the value of the field "Len" is "0x80" and the field length of the field "Payload" is 128 bytes; in this case, it is inferred that the condition also matches that for the second operating system 44.

Thus, with the use of only the format, there is a possibility that it is determined that the received command 121 is directed to two or more operating systems. There is a possibility that the operating system may not be determined by the determination using only the format. For this reason, in this embodiment, a configuration is employed in which a process of referencing management tables is also executed in a downstream process so that the operating system can be reliably determined.

However, except for the just-described example, the received command 121 can be identified as being directed to one operating system using only the format. In such a case, it may be determined that the command is directed to the identified operating system, and the subsequent processes may be executed. Accordingly, the processing is configured to be performed based on the flowchart shown in FIG. 16.

Specifically, in step S403, the operating system of the received command 121 is determined from the format. In step S404, using the determination result, it is determined whether or not the operating system of the transfer destination has been decided. Here, the conditions in which it is determined that the operating system of the transfer destination has been decided is shown below.

First, the command is determined not to correspond to two or more operating systems, as described above, i.e., the command is determined to correspond to only one operating system. Furthermore, the operating system that is determined as the destination is the second operating system 44. Here, the reason why the condition that the destination is the second operating system 44 is set is as follows.

The second operating system 44 is an operating system that is capable of adding an application (i.e., capable of adding a command). As a consequence, for example, a command that is not listed in the management table 142-1 or the management table 142-2 (FIG. 12) may also be received as being directed to the second operating system 44.

If the command is listed in the management table 142 when referencing the management table 142 in a downstream process, it is established that the command is directed to the second operating system 44, so the received command is passed to the second operating system 44. Even if the command is not listed in the management table 142 when referencing the management table 142 in a downstream process, the command is likely to be the one directed to the second operating system 44, so the received command is passed to the second operating system 44.

As a result, even when a further determination by referencing the management table 142 is performed after the operating system of the transfer destination for the command 121 has been determined as the second operating system 44 with the use of format, the command is transferred to the second operating system 44 irrespective of the determination result. For this reason, it is possible to transfer the command to the second operating system 44 without referencing the management table 142 when the result of determination using the format indicates the second operating system 44. Here, the description is continued assuming that the process is performed in the just-described manner.

However, in order to improve reliability, it is possible to reference the management tables even when the command is determined to be directed to the second operating system 44. In this case, because the command is determined as being directed to the second operating system 44 using the format, it is sufficient that only the management table 142 for the second operating system 44 be referenced when referencing the management tables in the downstream processes. This also applies to the first operating system 43. When the command is determined as being directed to the first operating system 43 using the format, it is sufficient that only the management table 141 for the first operating system 43 be referenced when referencing the management tables in the downstream processes.

This means that it becomes possible to narrow down the management table to be referenced based on the determination using the format. By performing the narrowing, the number of tables to be referenced can be reduced, so the speed of the processing can be made faster. Moreover, the processing can be made irrespective of the operating system in a series of flow in which the management tables are narrowed using the format and the target operating system is decided by referencing the narrowed management tables. Therefore, for example, it becomes possible to simplify the program or the like related to such determination.

Moreover, in order to enhance the security, the determination by using the format and the determination by referencing the management tables are performed at all times. This is, for example, to prevent the command 121 that is directed to the second operating system 44 maliciously from being passed to the second operating system 44. It is also possible to prevent a malicious command from being passed to the second operating system 44 by referencing the management tables.

Here, the description is continued assuming the following. In step S404, if it is determined that the command corresponds to only one operating system and the determined operating system is the second operating system 44, the command 121 is transferred to the second operating system 44 without referencing the management tables.

If it is determined in step S404 that the operating system to which the received command is to be transferred has been decided because the foregoing conditions were met, the process proceeds to step S408. In step S408, the format determination unit 421 passes the information indicating the operating system to be started (switched), to the memory control unit 103. While such a process is being executed, the format determination unit 421 passes the operating system designation information and the received command to the command transfer unit 104 in step S409.

On the other hand, if it is determined in step S404 that the operating system to which the received command is to be transferred has not been able to be decided because the foregoing conditions were not met, the process proceeds to step S405. In step S405, the received command 121 and the determination result using the format are supplied from the format determination unit 421 to the command determination unit 101. Then, the command determination unit 101 calls the management tables retained in the management table retaining unit 102.

The command determination unit 101 narrows down the management tables to be called using the determination result from the format, and calls only the narrowed-down management table. Specifically, for example, if the determination result from the format is the first operating system 43, the management table 41 for the first operating system 43 is called. By determining the format, the management tables to be called can be narrowed down, so the speed of the processing can be made faster.

If it is determined in step S404 that the destination operating system has not been able to be decided because it is determined that both the first operating system 43 and the second operating system 44 may be the destination operating system using the determination from the format, the process also proceeds to step S405. In this case, the management table 141 for the first operating system 43 and the management table 142 for the second operating system 44 are called.

In step S406, the command determination unit 101 determines whether or not the supplied command 121 has been registered in the called management table(s). The process after step S406 is basically the same as that after step S104 in the flowchart of FIG. 5, and therefore, the description thereof will be omitted.

Thus, in the fourth embodiment, it is determined whether the received command 121 is the command 121 directed to the first operating system 43 or the command 121 directed to the second operating system 44 from a difference between the format of the command of the first operating system 43 and that of the second operating system 44. Then, for the result that has not been able to be determined from the format, it is further determined whether the received command 121 is the command 121 directed to the first operating system 43 or the command 121 directed to the second operating system 44. The result that has not been able to be determined from the format refers to the result in the cases where the operating systems were not narrowed down to one operating system by the determining from the format, where the operating systems were narrowed down to one operating system but the narrowed-down operating system was not an operating system capable of adding an application, or where the configuration is set such that the operating system is not decided only from the format but tables are referenced at all times.

In the fourth embodiment described above, it has been described that the format information is retained by the format determination unit 421. It is also possible that the management table may contain the format information as a part of information that constitutes the management table. When the management table contains the format information, the process of calling a management table that is executed in step S405 is configured to be executed at a time point before step S403 in the process of the flowchart of FIG. 16. Then, using the format information contained in the management table that has been called, the determining process from the format in step S403 is executed. Such a configuration is also possible.

The fourth embodiment may be embodied either alone or in combination with the first through third embodiments. In addition, it is possible to obtain the same advantageous effects in the fourth embodiment as in the first through third embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a contactless antenna module configured to enable contactless communications;
a communication unit configured to perform contactless communication with an external device using the contactless antenna module;
a memory configured to store a table which associates a command with an operating system which is configured to execute commands; and
a controller configured to communicate with the communication unit and determine a destination operating system of a plurality of different operating systems, which are each stored in a same device, for a received command according to the table, and at least a first operating system of the plurality of different operating systems is incapable of deleting an application, wherein a master-slave relationship exists between the controller and the plurality of different operating systems,
wherein the controller is configured to determine that one of the plurality of different operating systems is the destination operating system based on header information of the received command and the table, enabling a contactless data exchange between the external device and the destination operating system through the controller.

2. The information processing apparatus according to claim 1, wherein the controller is configured to transmit the received command to the destination operating system.

3. The information processing apparatus according to claim 2, wherein
the table is configured to have commands associated with at least the first operating system and a second operating system, and
the second operating system is capable of adding and deleting an application.

4. The information processing apparatus according to claim 3, wherein the controller is configured to add a command associated with an application for the second operating system to the table based on an application addition.

5. The information processing apparatus according to claim 4, wherein the controller is configured to delete the command associated with the application from the table based on an application deletion.

6. A method comprising:
configuring a contactless antenna module to enable contactless communications;
configuring a communication unit to perform contactless communication with an external device using the contactless antenna module;
storing, in a memory, a table which associates a command with an operating system which is configured to execute commands;
communicating, by the controller, with the communication unit; and
determining, by a controller, a destination operating system of a plurality of different operating systems, which are each stored in a same device, for a received command according to the table, and at least a first operating system of the plurality of different operating systems is incapable of deleting an application,
wherein a master-slave relationship exists between the controller and the plurality of different operating systems, and
wherein the controller is configured to determine that one of the plurality of different operating systems is the destination operating system based on header information of the received command and the table, enabling a contactless data exchange between the external device and the destination operating system through the controller.

7. The method according to claim 6, further comprising: transmitting the received command to the destination operating system.

8. The method according to claim 7, wherein
the table is configured to have commands associated with at least the first operating system and a second operating system, and
the second operating system is capable of adding and deleting an application.

9. The method according to claim 8, further comprising: adding, by the controller, a command associated with an application for the second operating system to the table based on an application addition.

10. The method according to claim 9, further comprising: deleting, by the controller, the command associated with the application from the table based on an application deletion.

\* \* \* \* \*